US012809383B2

(12) United States Patent
Iwazaki et al.

(10) Patent No.: US 12,809,383 B2
(45) Date of Patent: Nov. 24, 2026

(54) REMOTE CONTROL DEVICE, CONTROL SYSTEM, AND MOVING OBJECT

(71) Applicant: TOYOTA JIDOSHA KABUSHIKI KAISHA, Toyota (JP)

(72) Inventors: Noritsugu Iwazaki, Sunto-gun (JP); Daiki Yokoyama, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 144 days.

(21) Appl. No.: 18/605,024

(22) Filed: Mar. 14, 2024

(65) Prior Publication Data

US 2024/0345587 A1 Oct. 17, 2024

(30) Foreign Application Priority Data

Apr. 17, 2023 (JP) ................................ 2023-066865
Oct. 19, 2023 (JP) ................................ 2023-180282

(51) Int. Cl.

| | |
|---|---|
| ***G05D 1/221*** | (2024.01) |
| ***B60W 30/14*** | (2006.01) |
| ***B60W 30/16*** | (2020.01) |
| ***G05D 1/69*** | (2024.01) |
| *G05D 107/70* | (2024.01) |
| *G05D 109/10* | (2024.01) |

(52) U.S. Cl.

CPC ........... *G05D 1/221* (2024.01); *B60W 30/143* (2013.01); *B60W 30/16* (2013.01); *G05D 1/69* (2024.01); *B60W 2554/802* (2020.02); *G05D 2107/70* (2024.01); *G05D 2109/10* (2024.01)

(58) Field of Classification Search

None
See application file for complete search history.

(56) References Cited

U.S. PATENT DOCUMENTS 8,761,989 B1 * 6/2014 Murphy .................. G05D 1/00
701/25
9,486,917 B2 * 11/2016 Reid ...................... B23P 19/06
2017/0320529 A1 * 11/2017 Nordbruch ........... G05D 1/0212
2018/0275681 A1 * 9/2018 Gariepy ........... G05B 19/41805
2020/0130689 A1 * 4/2020 Hanslik ............ G08G 1/096791
2020/0140028 A1 * 5/2020 Wells .................. G05D 1/0225
2020/0159249 A1 * 5/2020 Mithal .................. B65G 43/10
(Continued)

FOREIGN PATENT DOCUMENTS

JP 2017-538619 A 12/2017
JP 2021-142841 A 9/2021

*Primary Examiner* — Redhwan K Mawari
*Assistant Examiner* — Nada Mahyoob Alqaderi
(74) *Attorney, Agent, or Firm* — Oliff PLC

(57) ABSTRACT

A remote control device includes a step information acquisition unit that acquires production step information; a target setting unit that sets a target distance between a front moving object and a rear moving object according to the production step information; a signal generation unit that generates at least one of a front first control signal as a control signal to define the running operation of the front moving object and a rear first control signal as a control signal to define the running operation of the rear moving object so as to set the actual distance between the front moving object and the rear moving object to the target distance; and a transmission unit that transmits the first control signal to the moving object subjected to control of the operation.

15 Claims, 15 Drawing Sheets

(56) References Cited

U.S. PATENT DOCUMENTS

| | | | | |
|---|---|---|---|---|
| 2021/0141392 | A1* | 5/2021 | Gariepy | G05B 19/41805 |
| 2021/0284152 | A1 | 9/2021 | Koike et al. | |
| 2021/0294352 | A1* | 9/2021 | Kessler | G05D 1/227 |

* cited by examiner

REMOTE CONTROL DEVICE, CONTROL SYSTEM, AND MOVING OBJECT

CROSS-REFERENCE TO RELATED APPLICATIONS

This application claims priority to Japanese Patent Application No. 2023-066865 filed on Apr. 17, 2023, and Japanese Patent Application No. 2023-180282 filed on Oct. 19, 2023, each of which is incorporated herein by reference in its entirety.

BACKGROUND

Field

The present disclosure relates to a remote control device, a control system, and a moving object.

Related Art

Vehicles that automatically run within a production system for manufacturing vehicles by remote control have hitherto been known.

In the previously-known technologies, there may be cases where the actual inter-vehicle distance between vehicles that are running automatically by remote control is not appropriate for the content of the production step performed during the production process. Therefore, if the actual distance between vehicles is longer than the inter-vehicle distance appropriate for the work, the time required to manufacture the vehicles increases. Also, if the actual distance between vehicles is shorter than the inter-vehicle distance appropriate for the work, the work may be hindered. These problems are common not only in vehicles but also in moving objects.

SUMMARY

The present disclosure may be realized by the following aspects.

(1) According to the first aspect of the present disclosure, a remote control device is provided. The remote control device performs remote control of operation of a plurality of moving objects capable of moving by unmanned driving, wherein a plurality of production steps are performed on the plurality of moving objects in a production process in a factory, the plurality of moving objects include a front moving object and a rear moving object that runs behind the front moving object, and the remote control device comprises: a step information acquisition unit that acquires, for at least one of the front moving object and the rear moving object, production step information, which is information regarding one production step that is being performed on the moving object; a target setting unit that sets a target distance between the front moving object and the rear moving object according to the production step information; a signal generation unit that generates a first control signal, which is at least one of a front first control signal as a control signal to define the operation of the front moving object and a rear first control signal as a control signal to define the operation of the rear moving object so as to set an actual distance between the front moving object and the rear moving object to the target distance; and a transmission unit that transmits the first control signal to the moving object subjected to control of the operation. According to the above aspect, the target distance between the front moving object and the rear moving object can be set according to the production step information regarding one production step. This allows the actual distance between the front moving object and the rear moving object to be adjusted so that the actual distance between the front moving object and the rear moving object becomes the target distance according to the production step information. This enables adjustment of the actual distance between the front moving object and the rear moving object to an inter-moving object distance appropriate for the content of the work of the one production step. This prevents the actual distance between the front moving object and the rear moving object from being unnecessarily longer than the target distance. This reduces the possibility that the actual distance between the front moving object and the rear moving object becomes longer than necessary and accordingly the time required to produce moving objects increases. This also prevents the actual distance between the front moving object and the rear moving object from being unnecessarily shorter than the target distance. This reduces the possibility that the actual distance between the front moving object and the rear moving object becomes shorter than necessary and accordingly the work during the production of moving objects is interfered with.

(2) The aspect described above may be such that the production step information includes inter-moving-object work information, which indicates whether or not an inter-moving-object work, in which workers enter a region between the front moving object and the rear moving object to work, is performed, and the target setting unit sets the target distance in the production step in which the inter-moving-object work is performed to be longer than the target distance in the production step in which the inter-moving-object work is not performed, using the production step information. According to the above aspect, the target distance can be set so that the target distance in a production step in which the inter-moving-object work is performed is longer than the target distance in a production step in which the inter-moving-object work is not performed. In this way, it is possible to more reliably ensure a work area in which workers enter to engage in the work between the front moving object and the rear moving object. This reduces the possibility of interference during the inter-moving-object work and also ensures safety when workers are engaged in the inter-moving-object work.

(3) The aspect described above may be such that, when the target distance is longer than the actual distance, the signal generation unit generates the rear first control signal to cause the rear moving object to perform at least one of a deceleration process to decrease acceleration in a forward direction and a backing process to move backward in an opposite direction of the forward direction. According to the above aspect, the actual distance between the front moving object and the rear moving object can be increased by controlling at least one of the acceleration and the traveling direction of the rear moving object.

(4) The aspect described above may be such that, when the target distance is longer than the actual distance, the signal generation unit generates the front first control signal to cause the front moving object to perform an acceleration process to increase acceleration in a forward direction. According to the above aspect, the actual distance between the front moving object and the rear moving object can be increased by controlling the acceleration of the front moving object.

(5) The aspect described above may be such that the production process has a movement process in which the moving object moves between a first work site where the one production step is performed and a second work site where a next production step, which is performed after the one production step, is performed, the remote control device further comprises a determination unit that determines whether or not the one production step has been completed, and when it is determined by the determination unit that the one production step in which the inter-moving-object work is performed has been completed, the target setting unit sets the target distance to a standard distance, which is a distance between the front moving object and the rear moving object and is shorter than the target distance when the inter-moving-object work is performed, the signal generation unit generates a second control signal, which is at least one of a front second control signal as the control signal to define the operation of the front moving object and a rear second control signal as the control signal to define the operation of the rear moving object so as to set the actual distance to the standard distance as the target distance in the movement process, and the transmission unit transmits the second control signal to the moving object subjected to control of the operation. According to the above aspect, it is possible to determine whether or not the one production step being performed on the moving object has been completed. Then, when it is determined that one production step in which the inter-moving-object work is performed has been completed, the target distance between the front moving object and the rear moving object can be set to a standard distance that is shorter than the target distance when the inter-moving-object work is performed. In this way, when it is determined that the one production step in which the inter-moving-object work is performed has been completed, the actual distance between the front moving object and the rear moving object in the movement process can be adjusted so that the actual distance between the front moving object and the rear moving object becomes the standard distance. This prevents the actual distance between the front moving object and the rear moving object from being longer than necessary after the completion of the one production step.

(6) The aspect described above may be such that the production process has a movement process in which the moving object moves between a first work site where the one production step is performed and a second work site where a next production step, which is performed after the one production step, is performed, the step information acquisition unit further acquires next production step information, which is information regarding the next production step, the remote control device further comprises a determination unit that determines whether or not the one production step has been completed, and when it is determined by the determination unit that the one production step has been completed, the target setting unit sets the target distance to a next target distance, which is a distance between the front moving object and the rear moving object according to the next production step information, the signal generation unit generates a third control signal, which is at least one of a front third control signal to define the operation of the front moving object and a rear third control signal to define the operation of the rear moving object so as to set the actual distance to the next target distance as the target distance in the movement process, and the transmission unit transmits the third control signal to the moving object subjected to control of the operation. According to the above aspect, it is possible to determine whether or not the one production step being performed on the moving object has been completed. Then, when it is determined that the one production step has been completed, the target distance between the front moving object and the rear moving object can be set to the next target distance according to the next production step information in the movement process. This allows adjustment of the actual distance between the front moving object and the rear moving object to the next target distance in the movement process when it is determined that the one production step has been completed. This enables adjustment of the actual distance between the front moving object and the rear moving object to an inter-moving object distance appropriate for the content of the work of the next production step in advance before the start of the next production step.

(7) The aspect described above may be such that the inter-moving-object work is an assembly work to assemble a communicable device capable of communication with the remote control device to the moving object, and the determination unit determines that the one production step in which the inter-moving-object work is performed has been completed when the remote control device is capable of communication with the communicable device, and determines that the one production step in which the inter-moving-object work is performed has not been completed when the remote control device is incapable of communication with the communicable device. According to the above aspect, it is possible to determine whether or not the one production step has been completed by using the availability of communication between the communicable device and the remote control device.

(8) According to the second aspect of the present disclosure, a moving object is provided. The moving object is capable of moving by unmanned driving in a factory where a plurality of production steps are performed in a production process for producing the moving object, wherein the moving object comprises a moving object control device that controls operation of the moving object, and the moving object control device comprises an operation control unit that controls the operation of the moving object using a control signal that is received from outside of the moving object, and that defines the operation of the moving object so as to set an actual distance between a front moving object and a rear moving object that moves behind the front moving object, to a target distance according to the production process. According to the above aspect, the operation of the moving object can be controlled by using the control signal to set the actual distance between the front moving object and the rear moving object to the target distance according to the production process. This allows the actual distance between the front moving object and the rear moving object to be adjusted so that the actual distance between the front moving object and the rear moving object becomes the target distance according to the production process.

(9) According to the third aspect of the present disclosure, a remote control method is provided. The remote control method performs remote control of operation of a plurality of moving objects capable of moving by unmanned driving, wherein a plurality of production steps are performed on a plurality of the moving objects in a production process in a factory, the plurality of moving objects include a front moving object and a rear moving object that runs behind the front moving object, and the remote control method comprises: a step information acquisition step of acquiring, for at least one of the front moving object and the rear moving object, production step information, which is information regarding one production step that is being performed on the moving object; a target setting step of setting a target distance between the front moving object and the rear moving object according to the production step information; a signal generation step of generating a first control signal, which is at least one of a front first control signal as a control signal to define the operation of the front moving object and a rear first control signal as a control signal to define the operation of the rear moving object so as to set an actual distance between the front moving object and the rear moving object to the target distance; and a transmission step of transmitting the first control signal to the moving object subjected to control of the operation. According to the above aspect, the target distance between the front moving object and the rear moving object can be set according to the production step information regarding one production step. This allows the actual distance between the front moving object and the rear moving object to be adjusted so that the actual distance between the front moving object and the rear moving object becomes the distance according to the production step information. This enables adjustment of the actual distance between the front moving object and the rear moving object to an inter-moving object distance appropriate for the content of the work of the one production step. This prevents the actual distance between the front moving object and the rear moving object from being unnecessarily longer than the target distance. This reduces the possibility that the actual distance between the front moving object and the rear moving object becomes longer than necessary and accordingly the time required to produce moving objects increases. This also prevents the actual distance between the front moving object and the rear moving object from being unnecessarily shorter than the target distance. This reduces the possibility that the actual distance between the front moving object and the rear moving object becomes shorter than necessary and accordingly the work during the production of moving objects is interfered with.

(10) According to the fourth aspect of the present disclosure, a control system is provided. The control system controls operation of a plurality of moving objects capable of moving by unmanned driving, wherein a plurality of production steps are performed on a plurality of the moving objects in a production process in a factory, and the control system comprises: the plurality of moving objects including a front moving object and a rear moving object that runs behind the front moving object; a step information acquisition unit that acquires, for at least one of the front moving object and the rear moving object, production step information, which is information regarding one production step that is being performed on the moving object; a target setting unit that sets a target distance between the front moving object and the rear moving object according to the production step information; a signal generation unit that generates a first control signal, which is at least one of a front first control signal as a control signal to define the operation of the front moving object and a rear first control signal as a control signal to define the operation of the rear moving object so as to set an actual distance between the front moving object and the rear moving object to the target distance; and an operation control unit that controls the operation of the moving object using the first control signal. According to the above aspect, the target distance between the front moving object and the rear moving object can be set according to the production step information regarding one production step. This allows the actual distance between the front moving object and the rear moving object to be adjusted so that the actual distance between the front moving object and the rear moving object becomes the target distance according to the production step information. This enables adjustment of the actual distance between the front moving object and the rear moving object to an inter-moving object distance appropriate for the content of the work of the one production step. This prevents the actual distance between the front moving object and the rear moving object from being unnecessarily longer than the target distance. This reduces the possibility that the actual distance between the front moving object and the rear moving object becomes longer than necessary and accordingly the time required to produce moving objects increases. This also prevents the actual distance between the front moving object and the rear moving object from being unnecessarily shorter than the target distance. This reduces the possibility that the actual distance between the front moving object and the rear moving object becomes shorter than necessary and accordingly the work during the production of moving objects is interfered with.

(11) The aspect described above may be such that the production step information includes inter-moving-object work information, which indicates whether or not an inter-moving-object work, in which workers enter a region between the front moving object and the rear moving object to work, is performed, and the target setting unit sets the target distance in the production step in which the inter-moving-object work is performed to be longer than the target distance in the production step in which the inter-moving-object work is not performed, using the production step information. According to the above aspect, the target distance can be set so that the target distance in a production step in which the inter-moving-object work is performed is longer than the target distance in a production step in which the inter-moving-object work is not performed. In this way, it is possible to more reliably ensure a work area in which workers enter to engage in the work between the front moving object and the rear moving object. This reduces the possibility of interference during the inter-moving-object work and also ensures safety when workers are engaged in the inter-moving-object work.

(12) The aspect described above may be such that, when the target distance is longer than the actual distance, the signal generation unit generates the rear first control signal to cause the rear moving object to perform at least one of a deceleration process to decrease acceleration in a forward direction and a backing process to move backward in an opposite direction of the forward direction. According to the above aspect, the actual distance between the front moving object and the rear moving object can be increased by controlling at least one of the acceleration and the traveling direction of the rear moving object.

(13) The aspect described above may be such that, when the target distance is longer than the actual distance, the signal generation unit generates the front first control signal to cause the front moving object to perform an acceleration process to increase acceleration in a forward direction. According to the above aspect, the actual distance between the front moving object and the rear moving object can be increased by controlling the acceleration of the front moving object.

(14) The aspect described above may be such that the production process has a movement process in which the moving object moves between a first work site where the one production step is performed and a second work site where a next production step, which is performed after the one production step, is performed, the control system further comprises a determination unit that determines whether or not the one production step has been completed, and when it is determined by the determination unit that the one production step in which the inter-moving-object work is performed has been completed, the target setting unit sets the target distance to a standard distance, which is a distance between the front moving object and the rear moving object and is shorter than the target distance when the inter-moving-object work is performed, the signal generation unit generates a second control signal, which is at least one of a front second control signal as the control signal to define the operation of the front moving object and a rear second control signal as the control signal to define the operation of the rear moving object so as to set the actual distance to the standard distance as the target distance in the movement process, and the operation control unit controls the operation of the moving object using the second control signal without using the first control signal in the movement process. According to the above aspect, it is possible to determine whether or not the one production step being performed on the moving object has been completed. Then, when it is determined that one production step in which the inter-moving-object work is performed has been completed, the target distance between the front moving object and the rear moving object can be set to a standard distance that is shorter than the target distance when the inter-moving-object work is performed. In this way, when it is determined that the one production step in which the inter-moving-object work is performed has been completed, the actual distance between the front moving object and the rear moving object in the movement process can be adjusted so that the actual distance between the front moving object and the rear moving object becomes the standard distance. This prevents the actual distance between the front moving object and the rear moving object from being longer than necessary after the completion of the one production step.

(15) The aspect described above may be such that the production process has a movement process in which the moving object moves between a first work site where the one production step is performed and a second work site where a next production step, which is performed after the one production step, is performed, the step information acquisition unit further acquires next production step information, which is information regarding the next production step, the control system further comprises a determination unit that determines whether or not the one production step has been completed, and when it is determined by the determination unit that the one production step has been completed, the target setting unit sets the target distance to a next target distance, which is a distance between the front moving object and the rear moving object according to the next production step information, the signal generation unit generates a third control signal, which is at least one of a front third control signal to define the operation of the front moving object and a rear third control signal to define the operation of the rear moving object so as to set the actual distance to the next target distance as the target distance in the movement process, and the operation control unit controls the operation of the moving object using the third control signal without using the first control signal in the movement process. According to the above aspect, it is possible to determine whether or not the one production step being performed on the moving object has been completed. Then, when it is determined that the one production step has been completed, the target distance between the front moving object and the rear moving object can be set to the next target distance according to the next production step information in the movement process. This allows adjustment of the actual distance between the front moving object and the rear moving object to the next target distance in the movement process when it is determined that the one production step has been completed. This enables adjustment of the actual distance between the front moving object and the rear moving object to an inter-moving object distance appropriate for the content of the work of the next production step in advance before the start of the next production step.

(16) The aspect described above may be such that the inter-moving-object work is an assembly work to assemble a communicable device capable of communication with outside of the moving object to the moving object, and the determination unit determines that the one production step in which the inter-moving-object work is performed has been completed when the communicable device is capable of communication with the outside of the moving object, and determines that the one production step in which the inter-moving-object work is performed has not been completed when the communicable device is incapable of communication with the outside of the moving object. According to the above aspect, it is possible to determine whether or not the one production step has been completed by using the availability of communication between the communicable device and the outside of the moving object.

(17) According to the fifth aspect of the present disclosure, a moving object is provided. The moving object is capable of moving by unmanned driving in a factory where a plurality of production steps are performed in a production process for producing the moving object, wherein the moving object comprises a moving object control device that controls operation of own moving object, and the moving object control device comprises: a step information acquisition unit that acquires production step information, which is information regarding one production step that is being performed on at least one of the own moving object and another moving object, which is another one of the moving object that moves at least one of ahead and behind of the own moving object; a target setting unit that sets a target distance between the own moving object and the another moving object according to the production step information; a signal generation unit that generates a first control signal as a control signal to define the operation of the own moving object so as to set an actual distance between the own moving object and the another moving object to the target distance; and an operation control unit that controls the operation of the own moving object using the first control signal. According to the above aspect, the target distance between the own moving object and the another moving object can be set according to the production step information regarding the one production step. This allows the actual distance between the own moving object and the another moving object to be adjusted so that the actual distance between the own moving object and the another moving object becomes the target distance according to the production step information. This enables adjustment of the actual distance between the own moving object and the another moving object to an inter-moving object distance appropriate for the content of the work of the one production step. This prevents the actual distance between the own moving object and the another moving object from being unnecessarily longer than the target distance. This reduces the possibility that the actual distance between the own moving object and the another moving object becomes longer than necessary and accordingly the time required to produce moving objects increases. This also prevents the actual distance between the own moving object and the another moving object from being unnecessarily shorter than the target distance. This reduces the possibility that the actual distance between the own moving object and the another moving object becomes shorter than necessary and accordingly the work during the production of moving objects is interfered with.

(18) The aspect described above may be such that the production step information includes inter-moving-object work information, which indicates whether or not an inter-moving-object work, in which workers enter a region between the own moving object and the another moving object to work, is performed, and the target setting unit sets the target distance in the production step in which the inter-moving-object work is performed to be longer than the target distance in the production step in which the inter-moving-object work is not performed, using the production step information. According to the above aspect, the target distance can be set so that the target distance in a production step in which the inter-moving-object work is performed is longer than the target distance in a production step in which the inter-moving-object work is not performed. In this way, it is possible to more reliably ensure a work area in which workers enter to engage in the work between the own moving object and the another moving object. This reduces the possibility of interference during the inter-moving-object work and also ensures safety when workers are engaged in the inter-moving-object work.

(19) The aspect described above may be such that when the target distance is longer than the actual distance and the own moving object is moving the behind of the another moving object, the signal generation unit generates the first control signal to cause the own moving object to perform at least one of a deceleration process to decrease acceleration in a forward direction and a backing process to move backward in an opposite direction of the forward direction. According to the above aspect, the actual distance between the own moving object and the another moving object can be increased by controlling at least one of the acceleration and the traveling direction of the own moving object.

(20) The aspect described above may be such that when the target distance is longer than the actual distance and the own moving object is moving the ahead of the another moving object, the signal generation unit generates the first control signal to cause the own moving object to perform an acceleration process to increase acceleration in a forward direction. According to the above aspect, the actual distance between the own moving object and the another moving object can be increased by controlling the acceleration of the own moving object.

(21) The aspect described above may be such that the production process has a movement process in which the moving object moves between a first work site where the one production step is performed and a second work site where a next production step, which is performed after the one production step, is performed, the moving object control device further comprises a determination unit that determines whether or not the one production step has been completed, and when it is determined by the determination unit that the one production step in which the inter-moving-object work is performed has been completed, the target setting unit sets the target distance to a standard distance, which is a distance between the own moving object and the another moving object and is shorter than the target distance when the inter-moving-object work is performed, the signal generation unit generates a second control signal as the control signal to define the operation of the own moving object so as to set the actual distance to the standard distance as the target distance in the movement process, and the operation control unit controls the operation of the own moving object using the second control signal without using the first control signal in the movement process. According to the above aspect, it is possible to determine whether or not the one production step being performed on the moving object has been completed. Then, when it is determined that the one production step in which the inter-moving-object work is performed has been completed, the target distance between the own moving object and the another moving object can be set to the standard distance that is shorter than the target distance when the inter-moving-object work is performed. In this way, when it is determined that the one production step in which the inter-moving-object work is performed has been completed, the actual distance between the own moving object and the another moving object in the movement process can be adjusted so that the actual distance between the own moving object and the another moving object becomes the standard distance. This prevents the actual distance between the own moving object and the another moving object from being longer than necessary after the completion of the one production step.

(22) The aspect described above may be such that the production process has a movement process in which the moving object moves between a first work site where the one production step is performed and a second work site where a next production step, which is performed after the one production step, is performed, the step information acquisition unit further acquires next production step information, which is information regarding the next production step, the moving object control device further comprises a determination unit that determines whether or not the one production step has been completed, and when it is determined by the determination unit that the one production step has been completed, the target setting unit sets the target distance to a next target distance, which is a distance between the own moving object and the another moving object according to the next production step information, the signal generation unit generates a third control signal to define the operation of the own moving object so as to set the actual distance to the next target distance as the target distance in the movement process, and the operation control unit controls the operation of the own moving object using the third control signal without using the first control signal in the movement process. According to the above aspect, it is possible to determine whether or not the one production step being performed on the moving object has been completed. Then, when it is determined that the one production step has been completed, in the movement process, the target distance between the own moving object and the another moving object can be set to the next target distance according to the next production step information. This allows adjustment of the actual distance between the own moving object and the another moving object to the next target distance in the movement process when it is determined that the one production step has been completed. This enables adjustment of the actual distance between the own moving object and the another moving object to an inter-moving object distance appropriate for the content of the work of the next production step in advance before the start of the next production step.

(23) The aspect described above may be such that the inter-moving-object work is an assembly work to assemble a communicable device capable of communication with outside of the moving object to the moving object, and the determination unit determines that the one production step in which the inter-moving-object work is performed has been completed when the communicable device is capable of communication with outside of the own moving object, and determines that the one production step in which the inter-moving-object work is performed has not been completed when the communicable device is incapable of communication with the outside of the own moving object. According to the above aspect, it is possible to determine whether or not the one production step has been completed by using the availability of communication between the communicable device and the outside of the moving object.

(24) According to the sixth aspect of the present disclosure, an operation control method is provided. The operation control method controls operation of a plurality of moving objects capable of moving by unmanned driving, wherein a plurality of production steps are performed on a plurality of the moving objects in a production process in a factory, the plurality of moving objects include a front moving object and a rear moving object that runs behind the front moving object, and the operation control method comprises: a step information acquisition step of acquiring, for at least one of the front moving object and the rear moving object, production step information, which is information regarding one production step that is being performed on the moving object; a target setting step of setting a target distance between the front moving object and the rear moving object according to the production step information; a signal generation step of generating a first control signal, which is at least one of a front first control signal as a control signal to define the operation of the front moving object and a rear first control signal as a control signal to define the operation of the rear moving object so as to set an actual distance between the front moving object and the rear moving object to the target distance; and an operation control step of controlling the operation of the moving object using the first control signal. According to the above aspect, the target distance between the front moving object and the rear moving object can be set according to the production step information regarding one production step. This allows the actual distance between the front moving object and the rear moving object to be adjusted so that the actual distance between the front moving object and the rear moving object becomes the target distance according to the production step information. This enables adjustment of the actual distance between the front moving object and the rear moving object to an inter-moving object distance appropriate for the content of the work of the one production step. This prevents the actual distance between the front moving object and the rear moving object from being unnecessarily longer than the target distance. This reduces the possibility that the actual distance between the front moving object and the rear moving object becomes longer than necessary and accordingly the time required to produce moving objects increases. This also prevents the actual distance between the front moving object and the rear moving object from being unnecessarily shorter than the target distance. This reduces the possibility that the actual distance between the front moving object and the rear moving object becomes shorter than necessary and accordingly the work during the production of moving objects is interfered with.

The present disclosure may be embodied in various aspects other than the remote control device, the control system, the moving object, the remote control method, and the operation control method described above. For example, the present disclosure may be embodied in aspects of methods for producing a remote control device, a control system, and a moving object, computer programs that execute a remote control method and an operation control method, as well as non-transitory storage mediums storing the computer programs, and the like.

DETAILED DESCRIPTION

A. First Embodiment

A-1. Structure of Control System

Figure 1:
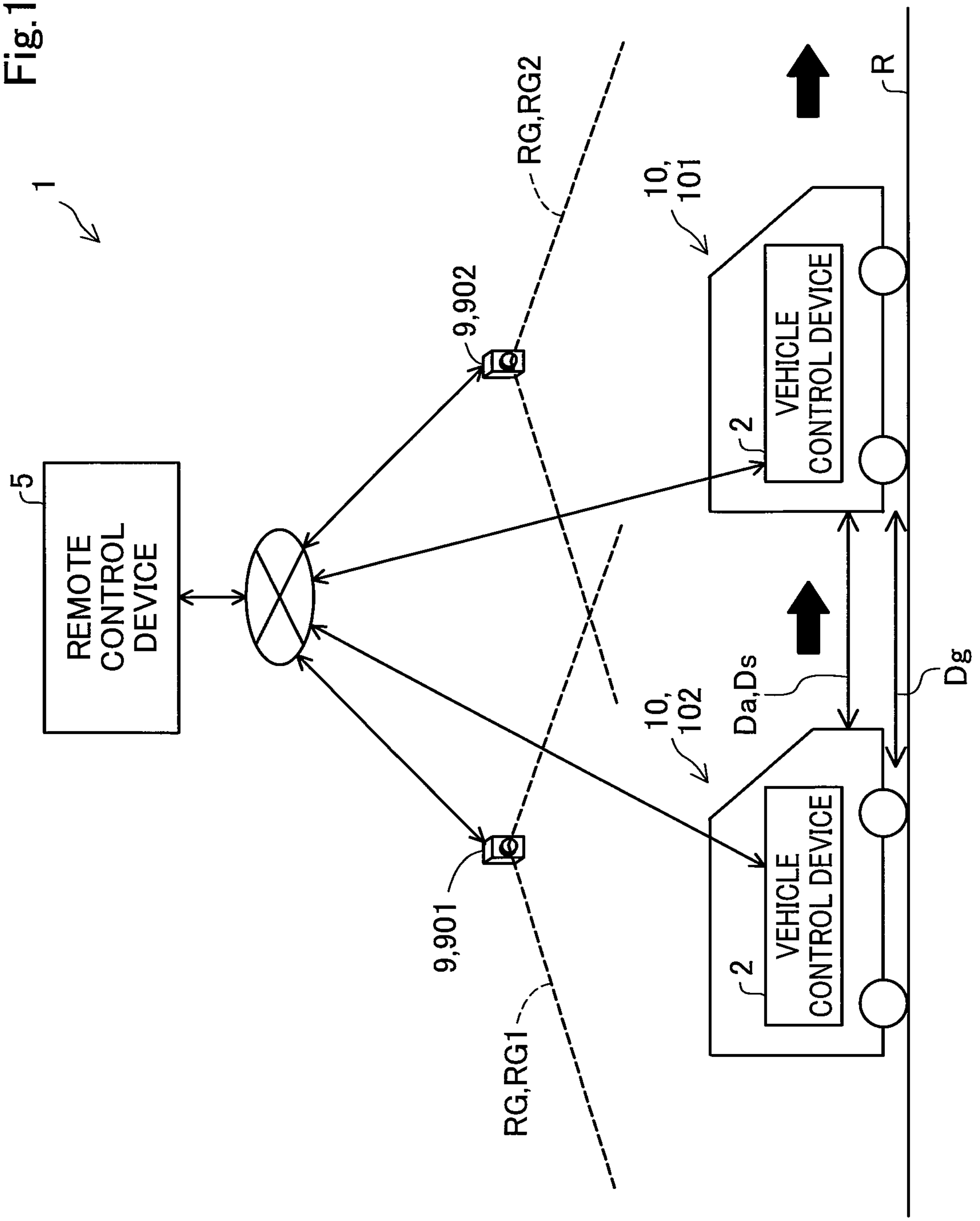
FIG. 1 shows a schematic structure of a control system in a first embodiment.

FIG. 1 shows a schematic structure of a control system 1 in the first embodiment. The control system 1 includes one or more external sensors, a plurality of moving objects, and a remote control device 5.

The external sensors are located outside a vehicle 10. The external sensors capture the vehicle 10 from outside the vehicle 10. Each external sensor is equipped with a communication device (not shown), and can communicate with other devices, such as the remote control device 5 and the like, via wired or wireless communication.

In the present embodiment, the external sensor is constituted of a camera. A camera 9 as the external sensor (hereafter referred to as an external camera 9) captures images including the vehicle 10, and outputs the captured images as detection results. In the following, the captured image output from the external camera 9 is also referred to as an "external camera image". The external camera 9 transmits the external camera image to the remote control device 5 together with camera identification information. The camera identification information is a unique ID (identifier) assigned to each of a plurality of external cameras 9 to identify them one another, and there is no overlap of camera identification information among the external cameras 9.

The location and number of the external cameras 9 are determined by considering an imaging range RG (angle of view) or the like of the external cameras 9 to capture the entire image of a track R by the external cameras 9. Specifically, the external cameras 9 are installed so that a first imaging range RG1, which is the imaging range RG of a first external camera 901, and a second imaging range RG2, which is the imaging range RG of a second external camera 902, overlap. The first external camera 901 and the second external camera 902 are adjacent to each other.

In the present disclosure, the "moving object" means an object capable of moving, and is a vehicle or an electric vertical takeoff and landing aircraft (so-called flying-automobile), for example. In the present embodiment, the moving object is the vehicle 10. The vehicle may be a vehicle to run with a wheel or may be a vehicle to run with a continuous track, and may be a passenger car, a track, a bus, a two-wheel vehicle, a four-wheel vehicle, a construction vehicle, or a combat vehicle, for example. The vehicle includes a battery electric vehicle (BEV), a gasoline automobile, a hybrid automobile, and a fuel cell automobile. When the moving object is other than a vehicle, the term "vehicle" or "car" in the present disclosure is replaceable with a "moving object" as appropriate, and the term "run" is replaceable with "move" as appropriate.

The vehicle 10 is configured to be capable of running by unmanned driving. The "unmanned driving" means driving independent of running operation by a passenger. The running operation means operation relating to at least one of "run," "turn," and "stop" of the vehicle 10. The unmanned driving is realized by automatic remote control or manual remote control using a device provided outside the vehicle 10 or by autonomous control by the vehicle 10. A passenger not involved in running operation may be on-board a vehicle running by the unmanned driving. The passenger not involved in running operation includes a person simply sitting in a seat of the vehicle 10 and a person doing work such as assembly, inspection, or operation of switches different from running operation while on-board the vehicle 10. Driving by running operation by a passenger may also be called "manned driving."

In the present specification, the "remote control" includes "complete remote control" by which all motions of the vehicle 10 are completely determined from outside the vehicle 10, and "partial remote control" by which some of the motions of the vehicle 10 are determined from outside the vehicle 10. The "autonomous control" includes "complete autonomous control" by which the vehicle 10 controls a motion of the vehicle 10 autonomously without receiving any information from a device outside the vehicle 10, and "partial autonomous control" by which the vehicle 10 controls a motion of the vehicle 10 autonomously using information received from a device outside the vehicle 10.

In the present embodiment, the vehicle 10 runs by remote control in a factory where a plurality of production steps are performed during production process of the vehicle 10. The reference coordinate system of the factory is the global coordinate system. That is, any location in the factory is expressed with X, Y, and Z coordinates in the global coordinate system. The factory is not limited to those present in a single building or those present at one property or one address. The factory may be present across multiple buildings, multiple properties, multiple addresses, and the like. For example, the vehicle 10 may run not only on private roads but also on public roads when the vehicle 10 moves between the production sites where each production step of the production process is performed.

Figure 2:
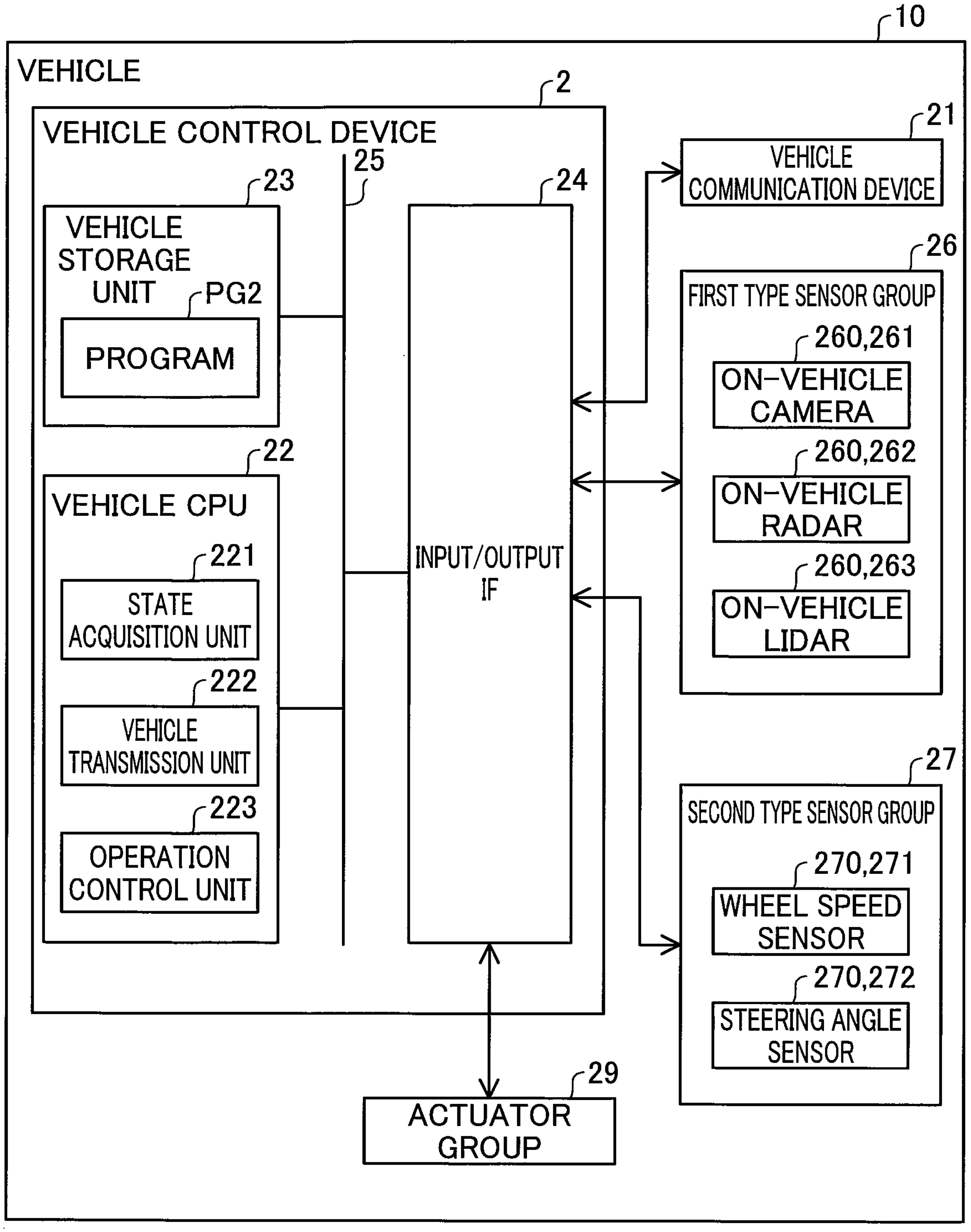
FIG. 2 shows a schematic structure of a vehicle in the first embodiment.

FIG. 2 shows a schematic structure of the vehicle 10 in the first embodiment. FIG. 2 shows a part that represents the structure of the vehicle 10. The vehicle 10 is equipped with a vehicle control device 2 that controls the operation of the vehicle 10, one or more actuator groups 29 driven under the control of the vehicle control device 2, and a vehicle communication device 21 for communicating with external devices such as the remote control device 5. The vehicle communication device 21 is, for example, a wireless communication device. The actuator group 29 includes an actuator for the driving device for accelerating the vehicle 10, an actuator for the steering device for changing the traveling direction of the vehicle 10, and an actuator for the braking device for decelerating the vehicle 10.

The vehicle 10 is further equipped with a first type sensor group 26 with a first type sensor 260 as an internal sensor, and a second type sensor group 27 with a second type sensor 270 as an internal sensor. The internal sensor is an on-vehicle sensor mounted on the vehicle 10.

The first type sensor group 26 includes a plurality of types of first type sensors 260. The first type sensor 260 is an internal sensor that acquires surrounding information that shows the state of the surrounding area of the vehicle 10. The first type sensor 260 transmits the acquired data to the vehicle control device 2. In the present embodiment, the first type sensor group 26 includes, as the first type sensor 260, an on-vehicle camera 261, an on-vehicle radar 262, and an on-vehicle LiDAR 263.

The on-vehicle camera 261 captures an image of a range that includes at least a part of the surrounding area of the vehicle 10, and outputs the captured image as a detection result. In the following, the captured image output from the on-vehicle camera 261 is also referred to as an "on-vehicle camera image". The on-vehicle camera image may be still image data or video data. The on-vehicle camera image may be color data or monochrome data.

The on-vehicle radar 262 emits a search wave (radio wave) to a predetermined search range and receives the reflected wave reflected by an object present in the surrounding area of the vehicle 10, thereby detecting the distance, angle, and relative speed, etc. with respect to the object in the surrounding area of the vehicle 10.

The on-vehicle LiDAR 263 emits a laser light to a predetermined measurement range and detects the reflected light reflected by an object present in the surrounding area of the vehicle 10, thereby detecting the distance, angle, and shape, etc. with respect to the object in the surrounding area of the vehicle 10. The structure of the first type sensor group 26 is not limited to that shown above.

The second type sensor group 27 includes a plurality of types of second type sensors 270. The second type sensor 270 is a sensor that acquires various physical quantities necessary to control the running operation of the vehicle 10. The second type sensor 270 transmits the acquired data to the vehicle control device 2. In the present embodiment, the second type sensor group 27 includes, as the second type sensor 270, a wheel speed sensor 271 and a steering angle sensor 272. The wheel speed sensor 271 measures the rotation rate (hereinafter referred to as "wheel speed") of each wheel. The steering angle sensor 272 measures an actual steering angle of each wheel. The structure of the second type sensor group 27 is not limited to that shown above.

The vehicle control device 2 includes a vehicle storage unit 23 as the storage unit of the vehicle control device 2, a vehicle CPU 22 as the central processing unit of the vehicle control device 2, and an input/output interface 24. The vehicle storage unit 23, the vehicle CPU 22, and the input/output interface 24 are connected via an internal bus 25 to enable bidirectional communication. The input/output interface 24 is connected to the vehicle communication device 21 and the actuator group 29.

The vehicle storage unit 23 stores various types of information, including various programs PG2 that control the running operation of the vehicle 10. The vehicle storage unit 23 includes, for example, RAM, ROM, a hard disk drive (HDD) and the like.

The vehicle CPU 22 functions as a state acquisition unit 221, a vehicle transmission unit 222, and an operation control unit 223 by expanding the various programs PG2 stored in the vehicle storage unit 23.

The state acquisition unit 221 acquires information (hereafter referred to as "on-vehicle sensor information") obtained by the first type sensor 260 and the second type sensor 270.

The vehicle transmission unit 222 transmits various types of information to the remote control device 5. For example, the vehicle transmission unit 222 transmits the on-vehicle sensor information to the remote control device 5, together with the vehicle identification information. The vehicle identification information is a unique ID (identifier) assigned to each of the plurality of vehicles 10 to identify them one another, and there is no overlap of vehicle identification information among the vehicles 10. The vehicle transmission unit 222 may transmit various types of information to the external camera 9.

The operation control unit 223 controls the actuator group 29 to cause the vehicle 10 to run. The operation control unit 223 controls the actuator group 29 using the running control signal received from the remote control device 5, thereby causing the vehicle 10 to run. The running control signal is a control signal for enabling the vehicle 10 to run. In the present embodiment, the running control signal includes the acceleration and the steering angle of the vehicle 10 as parameters. In other embodiments, the running control signal may include the speed of the vehicle 10 as a parameter instead of, or in addition to, the acceleration of the vehicle 10. At least some of the functions of the vehicle CPU 22 may be implemented as a function of the remote control device 5 or the external camera 9.

Figure 3:
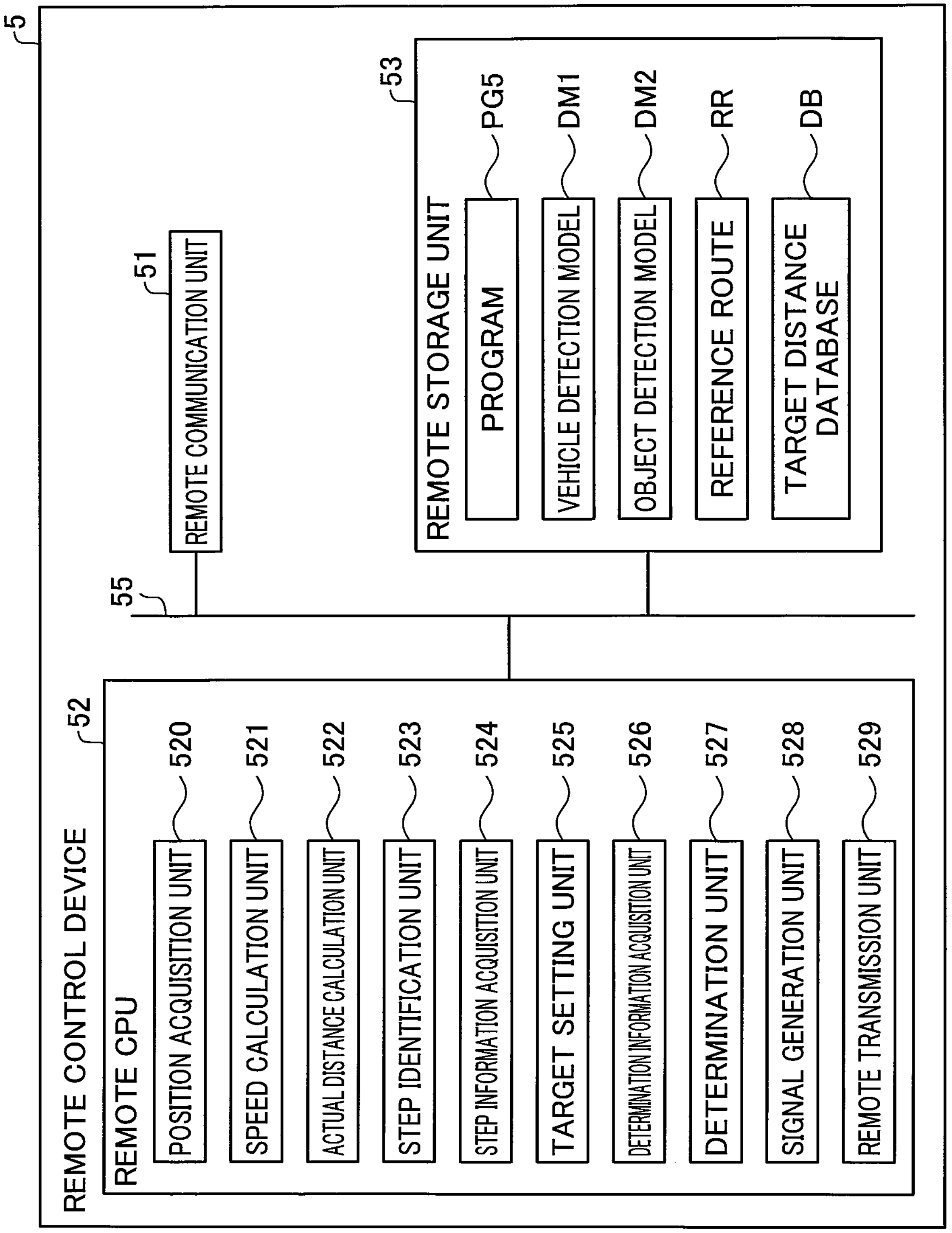
FIG. 3 shows a schematic structure of a remote control device in the first embodiment.

FIG. 3 shows a schematic structure of the remote control device 5 in the first embodiment. The remote control device 5 is, for example, a server installed in a factory. The remote control device 5 adjusts the actual distance between a front vehicle 101 and a rear vehicle 102 (hereinafter referred to as an "actual distance Da") by remote control of the running operation of at least one of the front vehicle 101 and the rear vehicle 102 as the vehicle 10. The rear vehicle 102 is a vehicle 10 running behind the front vehicle 101 in terms of the forward direction when the front vehicle 101 runs. The rear vehicle 102 runs continuously with the front vehicle 101 without any other vehicles 10 between them. In the following, each of the vehicles 101 and 102 is referred to simply as a "vehicle 10" when it is not necessary to distinguish them from one another.

The remote control device 5 includes a remote communication unit 51 as the communication unit of the remote control device 5, a remote storage unit 53 as the storage unit of the remote control device 5, and a remote CPU 52 as the central processing unit of the remote control device 5. The remote communication unit 51, the remote storage unit 53, and the remote CPU 52 are connected via an internal bus 55 to enable bidirectional communication.

The remote communication unit 51 communicatively connects the vehicle control device 2 and the external camera 9 to the remote control device 5. The remote communication unit 51 is, for example, a wireless communication device. The communication method by the remote communication unit 51 is not limited to that shown above.

The remote storage unit 53 stores various types of information, including various programs PG5 that control the operation of the remote control device 5, a vehicle detection model DM1, an object detection model DM2, a target distance database DB, and a reference route RR. The details of the vehicle detection model DM1, the object detection model DM2, the target distance database DB, and the reference route RR are described later. The remote storage unit 53 includes, for example, RAM, ROM, a hard disk drive (HDD) and the like.

The remote CPU 52 functions as a position acquisition unit 520, a speed calculation unit 521, an actual distance calculation unit 522, a step identification unit 523, a step information acquisition unit 524, and a target setting unit 525 by expanding the various programs PG5 stored in the remote storage unit 53.

Furthermore, the remote CPU 52 functions as a determination information acquisition unit 526, a determination unit 527, a signal generation unit 528, and a remote transmission unit 529 by expanding the various programs PG5 stored in the remote storage unit 53.

The position acquisition unit 520 acquires vehicle position information using detection results output from the external sensors. The vehicle position information is position information that serves as the base in generating the running control signals. In the present embodiment, the vehicle position information includes the position and orientation of the vehicle 10 in the global coordinate system of the factory. Specifically, the position acquisition unit 520 acquires the vehicle position information using external camera images acquired from the external cameras 9, which are external sensors.

In detail, the position acquisition unit 520 detects the outer shape of the vehicle 10, for example, from the external camera image, calculates the coordinates of the external camera image, i.e., the coordinates of the positioning point of the vehicle 10 in the local coordinate system, and converts the calculated coordinates to the coordinates in the global coordinate system to acquire the position of the vehicle 10. The outer shape of the vehicle 10 in the captured image may be detected by inputting the external camera image to a detection model using artificial intelligence, for example. The detection model is prepared in the control system 1 or outside the control system 1. The detection model is stored in advance in a memory of the remote storage unit r 53, for example. An example of the detection model is a learned machine learning model that was learned so as to realize either semantic segmentation or instance segmentation. For example, a convolution neural network (CNN) learned through supervised learning using a learning dataset is applicable as this machine learning model. The learning dataset contains a plurality of training images including the vehicle 10, and a label showing whether each region in the training image is a region indicating the vehicle 10 or a region indicating a subject other than the vehicle 10, for example. In training the CNN, a parameter for the CNN is preferably updated through backpropagation in such a manner as to reduce error between output result obtained by the detection model and the label. The server 200 can acquire the orientation of the vehicle 10 through estimation based on the direction of a motion vector of the vehicle 10 detected from change in location of a feature point of the vehicle 10 between frames of the captured images using optical flow process, for example.

The speed calculation unit 521 calculates the running speed of the vehicle 10. The speed calculation unit 521 calculates the running speed of the vehicle 10 using, for example, the output value of the wheel speed sensor 271 mounted on the vehicle 10. In this case, the speed calculation unit 521 calculates the running speed of the vehicle 10 based on the wheel speed per unit time after performing calculations such as averaging the wheel speed of each wheel. The method for calculating the running speed of the vehicle 10 is not limited to that described above. Further, at least some of the functions of the speed calculation unit 521 may be performed by the wheel speed sensor 271 or the vehicle CPU 22.

The actual distance calculation unit 522 calculates the actual distance Da between the front vehicle 101 and the rear vehicle 102. The actual distance calculation unit 522 calculates the actual distance Da between the front vehicle 101 and the rear vehicle 102, for example, by a calculation process using the vehicle position information, the running speed of the vehicle 10, and the elapsed time after the acquisition of the vehicle position information, etc. The method for calculating the actual distance Da between the front vehicle 101 and the rear vehicle 102 is not limited to that described above. The actual distance calculation unit 522 may, for example, calculate the actual distance Da between the front vehicle 101 and the rear vehicle 102 using the detection results output from the internal sensors. The actual distance calculation unit 522 may calculate the actual distance Da between the front vehicle 101 and the rear vehicle 102 using the external camera images.

The step identification unit 523 identifies one production step being performed on the vehicle 10 targeted for the remote control, from among a plurality of production steps in the production process of the vehicle 10. The step identification unit 523 identifies the production step being performed on the vehicle 10 targeted for the remote control by detecting, for example, feature points that allow identification of a plurality of production steps included in the on-vehicle camera image through image analysis. Specifically, for example, if there is an object (hereinafter referred to as a "feature object") installed only at the work site where the one production step is performed, the step identification unit 523 detects the feature object included in the on-vehicle camera image as feature points. That is, in this case, the feature point is the shape of the feature object. Further, for example, if different colors are given to the wall surfaces of the work site that is located indoor depending on the production step, the step identification unit 523 detects the color of the wall surface included in the on-vehicle camera image as feature points. Further, for example, if objects with labels, such as letters, symbols, figures, etc. for identifying a plurality of production steps are installed at a work site, the step identification unit 523 detects the labels included in the internal captured image as feature points. The method for identifying the one production step being performed on the vehicle 10 is not limited to that described above. The step identification unit 523 may identify the one production step being performed on the vehicle 10 by using the external camera image.

The step information acquisition unit 524 acquires information (hereinafter referred to as production step information) regarding the one production step being performed on at least one of the front vehicle 101 and the rear vehicle 102. That is, the step information acquisition unit 524 acquires production step information with regard to the one production step identified by the step identification unit 523. The production step information is information in which production step identification information and work information are associated with each other. The production step identification information is a unique ID (identifier) assigned to each of the plurality of production steps included in the production process of the vehicle 10 to identify them one another, and there is no overlap of production step identification information among the production steps. The work information indicates the content of work of the production step identified by the production step identification information. In other words, the production step information indicates which of a plurality of production steps in the production process is to be performed, as well as the content of work to be performed. Therefore, the number of production step information is the same as the number of production steps in the production process.

In the present embodiment, the work information includes inter-vehicle work information. The inter-vehicle work information indicates whether or not a work performed by allowing workers to enter the space between the front vehicle 101 and the rear vehicle 102 (this work will be hereinafter referred to as "inter-vehicle work") is performed. The inter-vehicle work is an assembly work to assemble, for example, parts such as lamps (not shown) and stickers (not shown) or on-vehicle devices such as batteries (not shown) to the rear side of the front vehicle 101 or to the front side of the rear vehicle 102. The inter-vehicle work is also a function inspection work to inspect, for example, the functions of parts such as the trunk door and hatchback attached to the rear side of the front vehicle 101 or the hood or the like attached to the front side of the rear vehicle 102. Furthermore, the inter-vehicle work is an appearance inspection work to inspect the external appearance of the vehicle 10, for example, to check for removal or other defects in the coating on the rear side of the front vehicle 101 or the front side of the rear vehicle 102. The types of information included in the production step information and the types of the inter-vehicle work are not limited to those described above.

The target setting unit 525 sets a target distance Dg between the front vehicle 101 and the rear vehicle 102 according to the production process. Specifically, the target setting unit 525 sets the target distance Dg between the front vehicle 101 and the rear vehicle 102 according to the content of work indicated by the work information associated with the production step identification information indicating the one production step that is being performed on the front vehicle 101 or the rear vehicle 102. If the one production step is being performed, the target setting unit 525 sets the target distance Dg to a distance according to the content of the work of the one production step. Specifically, the target setting unit 525 sets the target distance Dg using, for example, the target distance database DB stored in advance in the remote storage unit 53 as well as the production step information acquired by the step information acquisition unit 524. The target distance database DB is a database in which the production step identification information and the target distance Dg according to the content of the work of the production step identified by the production step identification information are associated with each other. At this time, the target setting unit 525 sets the target distance Dg for the production step in which the inter-vehicle work is performed to be longer than the target distance Dg for the production step in which the inter-vehicle work is not performed, using the production step information. The target distance Dg in the production step in which the inter-vehicle work is performed is set, for example, according to the number of workers engaged in the inter-vehicle work and the range of the work region required for the inter-vehicle work. When the production step involving the inter-vehicle work is performed by letting only one worker enter the region between the front vehicle 101 and the rear vehicle 102, the target distance Dg is set to a value not less than 1 meter and not more than 2 meters, for example.

Further, the target setting unit 525 performs the following process when the determination unit 527 determines that the one production step that is being performed on the vehicle 10 and that involves inter-vehicle work has been completed. In this case, the target setting unit 525 sets the target distance Dg between the front vehicle 101 and the rear vehicle 102 to a standard distance Ds. The standard distance Ds is a distance between the front vehicle 101 and the rear vehicle 102 and is shorter than the target distance Dg in the case where the inter-vehicle work is being performed. The standard distance Ds may be the same as the target distance Dg in any production step in which inter-vehicle work is not performed, from among the plurality of production steps in the production process. For example, if the production process has a movement process and certain conditions are satisfied, the target setting unit 525 sets the target distance Dg between the front vehicle 101 and the rear vehicle 102 to the standard distance Ds. The movement process is a process in which the vehicle 10 runs between a first work site and a second work site during the production process. The first work site is the place where the one production step, which is performed on the vehicle 10 and identified by the step identification unit 523, is performed. The second work site is the place where the production step subsequent to the one production step is performed (this subsequent production step will be hereinafter referred to as a next production step). The case where the specific conditions are satisfied is, for example, a case where the first case and the second case are satisfied. The first case is a case where there is a movement process in which the vehicle 10 runs on the track R that connects the first work site and the second work site, because, for example, the first work site and the second work site are located in different buildings. The second case is a case where the one production step performed at the first work site is a production step in which inter-vehicle work is performed. The method for setting the target distance Dg and the content thereof are not limited to those described above. The target setting unit 525 may set the target distance Dg, for example, using on-vehicle sensor information or external camera images acquired by the first type sensor group 26 mounted on the vehicle 10.

The determination information acquisition unit 526 acquires information (hereinafter referred to as determination information) for determining whether or not the one production step identified by the step identification unit 523 has been completed. The determination information includes information such as on-vehicle camera images and external camera images acquired after the time point when the control to set the actual distance Da between the front vehicle 101 and the rear vehicle 102 to a distance according to the content of the work of the one production step was started. The types of information included in the determination information and the acquisition timing are not limited to those described above. The determination information may include, for example, on-vehicle sensor information other than on-vehicle camera images or vehicle position information.

The determination unit 527 determines whether or not the one production step being performed on the vehicle 10 has been completed using the determination information. In other words, the determination unit 527 determines whether or not the production step identified by the step identification unit 523 has been completed. The determination unit 527 determines whether or not the one production step being performed on the vehicle 10 has been completed by detecting, for example, a worker captured in the on-vehicle camera image or external camera image as the determination information by image analysis using the object detection model DM2. The object detection model DM2 is a trained machine learning model used to detect objects, such as workers, that have entered the surrounding area of the vehicle 10. For example, a CNN is used as the object detection model DM2. In this case, the determination unit 527 determines that the one production step has not been completed, for example, when a worker is detected in the surrounding area of the front vehicle 101 and the rear vehicle 102 in the on-vehicle camera image or the external camera image. On the other hand, the determination unit 527 determines that the one production step has been completed, for example, when no worker is detected in the surrounding area of the front vehicle 101 and the rear vehicle 102 in the on-vehicle camera image or the external camera image. The method for determining whether or not the one production step being performed on the vehicle 10 has been completed is not limited to that described above.

The signal generation unit 528 generates running control signals.

Specifically, the signal generation unit 528 determines the target location to which the vehicle 10 is supposed to go next. In the present embodiment, the target location is expressed by X, Y, and Z coordinates in the global coordinate system. The remote storage unit 53 of the remote control device 5 contains a reference route RR stored in advance as a route along which the vehicle 10 is to run. The route is expressed by a node indicating a departure place, a node indicating a way point, a node indicating a destination, and a link connecting nodes to each other. The signal generation unit 528 determines the target location to which the vehicle 10 is to move next using the vehicle location information and the reference route RR. The signal generation unit 528 determines the target location on the reference route RR ahead of a current location of the vehicle 10.

Next, the signal generation unit 528 generates a running control signal for causing the vehicle 10 to run toward the determined target location. The signal generation unit 528 calculates a running speed of the vehicle 10 from transition of the location of the vehicle 10 and makes comparison between the calculated running speed and a target speed of the vehicle 10. The target speed is determined, for example, according to the actual distance Da between the front vehicle 101 and the rear vehicle 102 and the target distance Dg between the front vehicle 101 and the rear vehicle 102. If the running speed is lower than the target speed, the signal generation unit 528 generally determines an acceleration in such a manner as to accelerate the vehicle 10. If the running speed is higher than the target speed as, the signal generation unit 528 generally determines an acceleration in such a manner as to decelerate the vehicle 10. If the vehicle 10 is on the reference route RR, server 200 determines a steering angle and an acceleration in such a manner as to prevent the vehicle 10 from deviating from the reference route RR. If the vehicle 10 is not on the reference route RR, in other words, if the vehicle 10 deviates from the reference route, the signal generation unit 528 determines a steering angle and an acceleration in such a manner as to return the vehicle 10 to the reference route RR.

In the present embodiment, the signal generation unit 528 generates the following running control signals using the reference route RR, the actual distance Da between the front vehicle 101 and the rear vehicle 102 and the target distance Dg, the running speeds of the front vehicle 101 and the rear vehicle 102, the target speed, the vehicle position information, and the like. The signal generation unit 528 generates a running control signal (hereinafter referred to as a first control signal) to set the actual distance Da between the front vehicle 101 and the rear vehicle 102 to the target distance Dg according to the production step information. At this time, the signal generation unit 528 generates a first control signal, which is at least one of a front first control signal and a rear first control signal.

The front first control signal is the first control signal that defines the running operation of the front vehicle 101 in order to set the actual distance Da between the front vehicle 101 and the rear vehicle 102 to the target distance Dg according to the production step information. For example, if the target distance Dg is longer than the actual distance Da between the front vehicle 101 and the rear vehicle 102, the signal generation unit 528 generates a front first control signal to cause the front vehicle 101 to perform an acceleration process to increase acceleration in the forward direction.

The rear first control signal is the first control signal that defines the running operation of the rear vehicle 102 in order to set the actual distance Da between the front vehicle 101 and the rear vehicle 102 to the target distance Dg according to the production step information. For example, if the target distance Dg is longer than the actual distance Da between the front vehicle 101 and the rear vehicle 102, the signal generation unit 528 generates the following rear first control signal. In this case, the signal generation unit 528 generates a rear first control signal to cause the rear vehicle 102 to perform at least one of a deceleration process to decrease the acceleration in the forward direction and a backing process to move the rear vehicle 102 backward in the opposite direction of the forward direction. Further, if the target distance Dg is longer than the actual distance Da between the front vehicle 101 and the rear vehicle 102, the signal generation unit 528 may generate the following rear first control signal. In this case, the signal generation unit 528 may generate the rear first control signal to cause the rear vehicle 102 to perform a stopping process to stop the running operation.

In the present embodiment, the first control signal includes, in addition to the acceleration of the vehicle 10, the steering angle as a parameter. This allows correction of positional deviation from the reference route RR in the process of changing the actual distance Da between the front vehicle 101 and the rear vehicle 102 to the target distance Dg.

When the first control signal is a running control signal to perform at least one of the acceleration process and the deceleration process, the signal generation unit 528 may further include a parameter that defines the duration of the running operation defined by the first control signal. In this way, the duration of running at the acceleration indicated by the first control signal can be specified. This allows to keep the actual distance Da between the front vehicle 101 and the rear vehicle 102 in a state of being close to the target distance Dg. Further, in this case, if the first control signal includes the steering angle as a parameter, the duration of running at the steering angle indicated by the first control signal can be specified. This allows to keep the relative position of the vehicle 10 in a state of being close to the reference route RR.

Further, when the first control signal is a running control signal to perform the backing process, the signal generation unit 528 may further include a parameter that defines the duration of the running operation defined by the first control signal. In this way, after the first control signal switches the traveling direction of the vehicle 10 from the forward direction to the backward direction, which is the opposite of the forward direction, the time required to return the traveling direction of the vehicle 10 from the backward direction to the forward direction can be specified. This allows to keep the actual distance Da between the front vehicle 101 and the rear vehicle 102 in a state of being close to the target distance Dg.

Further, when the first control signal is a running control signal to perform the stopping process, the signal generation unit 528 may further include a parameter that defines the duration of the running operation defined by the first control signal. In this way, the time the vehicle 10 is stopped by the first control signal can be specified. This allows to keep the actual distance Da between the front vehicle 101 and the rear vehicle 102 in a state of being close to the target distance Dg.

Further, the signal generation unit 528 performs the following process when the determination unit 527 determines that the one production step that is being performed on the vehicle 10 and that involves inter-vehicle work has been completed. In this case, the signal generation unit 528 generates a running control signal (hereinafter referred to as a second control signal) to set the actual distance Da between the front vehicle 101 and the rear vehicle 102 to the standard distance Ds as the target distance Dg in the movement process. At this time, the signal generation unit 528 generates a second control signal, which is at least one of a front second control signal and a rear second control signal.

The front second control signal is a second control signal to define the running operation of the front vehicle 101 in order to set the actual distance Da between the front vehicle 101 and the rear vehicle 102 to the standard distance Ds in the movement process. For example, if the standard distance Ds is shorter than the actual distance Da between the front vehicle 101 and the rear vehicle 102, the signal generation unit 528 generates the following front second control signal. In this case, the signal generation unit 528 generates a front second control signal to cause the front vehicle 101 to perform at least one of the deceleration process and the backing process. Further, if the standard distance Ds is shorter than the actual distance Da between the front vehicle 101 and the rear vehicle 102, the signal generation unit 528 may generate the front second control signal to cause the front vehicle 101 to perform the stopping process.

The rear second control signal is a second control signal to define the running operation of the rear vehicle 102 in order to set the actual distance Da between the front vehicle 101 and the rear vehicle 102 to the standard distance Ds in the movement process. For example, if the standard distance Ds is shorter than the actual distance Da between the front vehicle 101 and the rear vehicle 102, the signal generation unit 528 generates the rear second control signal to cause the rear vehicle 102 to perform the acceleration process.

In the present embodiment, the second control signal includes, in addition to the acceleration of the vehicle 10, the steering angle as a parameter. This allows correction of positional deviation from the reference route RR in the process of changing the actual distance Da between the front vehicle 101 and the rear vehicle 102 to the standard distance Ds.

When the second control signal is a running control signal to perform at least one of the acceleration process and the deceleration process, the signal generation unit 528 may further include a parameter that defines the duration of the running operation defined by the second control signal. In this way, the duration of running at the acceleration indicated by the second control signal can be specified. This allows to keep the actual distance Da between the front vehicle 101 and the rear vehicle 102 in a state of being close to the standard distance Ds. Further, in this case, if the second control signal includes the steering angle as a parameter, the duration of running at the steering angle indicated by the second control signal can be specified. This allows to keep the relative position of the vehicle 10 in a state of being close to the reference route RR.

Further, when the second control signal is a running control signal to perform the backing process, the signal generation unit 528 may further include a parameter that defines the duration of the running operation defined by the second control signal. In this way, after the second control signal switches the traveling direction of the vehicle 10 from the forward direction to the backward direction, which is the opposite of the forward direction, the time required to return the traveling direction of the vehicle 10 from the backward direction to the forward direction can be specified. This allows to keep the actual distance Da between the front vehicle 101 and the rear vehicle 102 in a state of being close to the standard distance Ds.

Further, when the second control signal is a running control signal to perform the stopping process, the signal generation unit 528 may further include a parameter that defines the duration of the running operation defined by the second control signal. In this way, the time the vehicle 10 is stopped by the second control signal can be specified. This allows to keep the actual distance Da between the front vehicle 101 and the rear vehicle 102 in a state of being close to the standard distance Ds.

The remote transmission unit 529 transmits the running control signal generated by the signal generation unit 528 to the vehicle 10 for which the running operation is to be controlled. The remote transmission unit 529 may transmit the running control signal to the vehicle 10 via an external device such as the external camera 9 or the like. In this case, the remote transmission unit 529 transmits the running control signal to the external camera 9. The external camera 9 then transmits the running control signal received from the remote control device 5 to the vehicle 10. This allows the vehicle 10 to receive the running control signal from the external camera 9 that is closer to the vehicle 10. This makes the transmission less susceptible to communication failures. Therefore, it is possible to reduce the likelihood that the vehicle 10 may stop due to a communication failure during the period of unmanned driving control.

The remote CPU 52 repeats the acquisition of the vehicle position information, the determination of the target location, the generation of the running control signal, the transmission of the running control signal, and the like, in a predetermined cycle. At least some of the functions of the remote CPU 52 may be implemented as a function of the vehicle control device 2 or the external camera 9.

A-2. Remote Control Method for Vehicle

Figure 4:
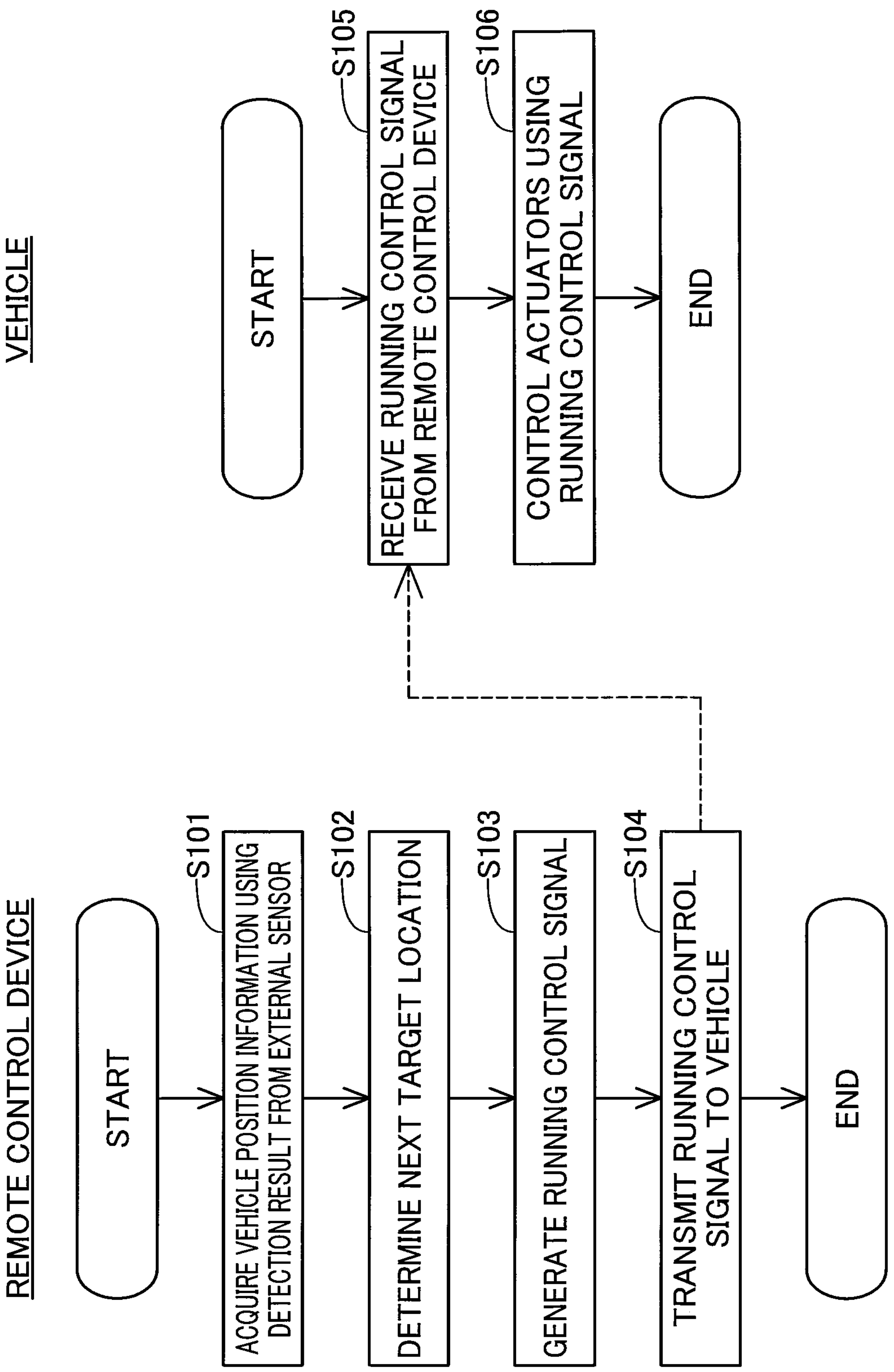
FIG. 4 is a flowchart of procedures in the process of running control of a vehicle in the first embodiment.

FIG. 4 is a flowchart of procedures in the process of running control of the vehicle 10 in the first embodiment. The flow shown in FIG. 4 is repeated, for example, every predetermined time from the time point at which the running of the vehicle 10 by unmanned driving is started.

In the step S101, the position acquisition unit 520 of the remote control device 5 acquires the vehicle position information using the detection result output from the external camera 9 as an external sensor. In the step S102, the signal generation unit 528 of the remote control device 5 determines the target location to which the vehicle 10 should go next. In the step S103, the signal generation unit 528 of the remote control device 5 generates a running control signal to cause the vehicle 10 to run toward the determined target location. In the step S4, the remote transmission unit 529 of the remote control device 5 transmits the generated running control signal to the vehicle 10.

In the step S105, the vehicle control device 2 mounted on the vehicle 10 receives the running control signal transmitted from the remote control device 5. In the step S106, the operation control unit 223 of the vehicle control device 2 controls the actuator group 29 using the received running control signal, thereby causing the vehicle 10 to run at the acceleration and the steering angle indicated by the running control signal. The vehicle control device 2 repeats the reception of the running control signal and the control of the actuator group 29 in a predetermined cycle. The control system 1 of the present embodiment enables the vehicle 10 to run by remote control, thereby moving the vehicle 10 without using transport equipment, such as a crane, a conveyor, or the like.

A-3. Method for Adjusting Inter-Vehicle Distance

The following describes an exemplary case in which, after the one production step that performs inter-vehicle work on the vehicle 10 is performed at the first work site, the next production step is performed at the second work site, and the vehicle 10 runs on the track R that connects the first work site and the second work site. That is, the following describes a control method in the case where the production process has a movement process and the one production step is performed on the vehicle 10.

Figure 5:
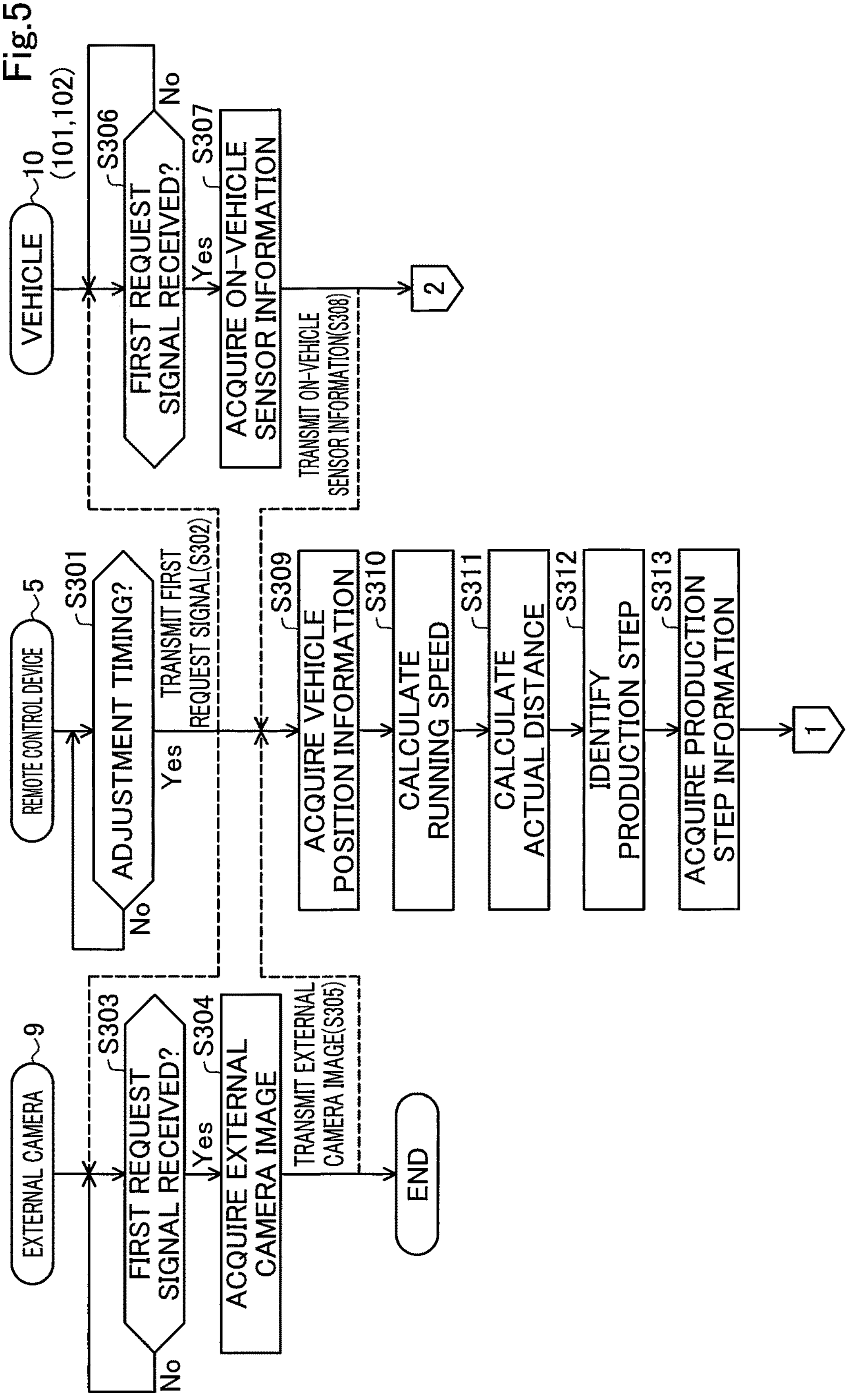
FIG. 5 is a first flowchart showing a first adjustment method.
Figure 6:
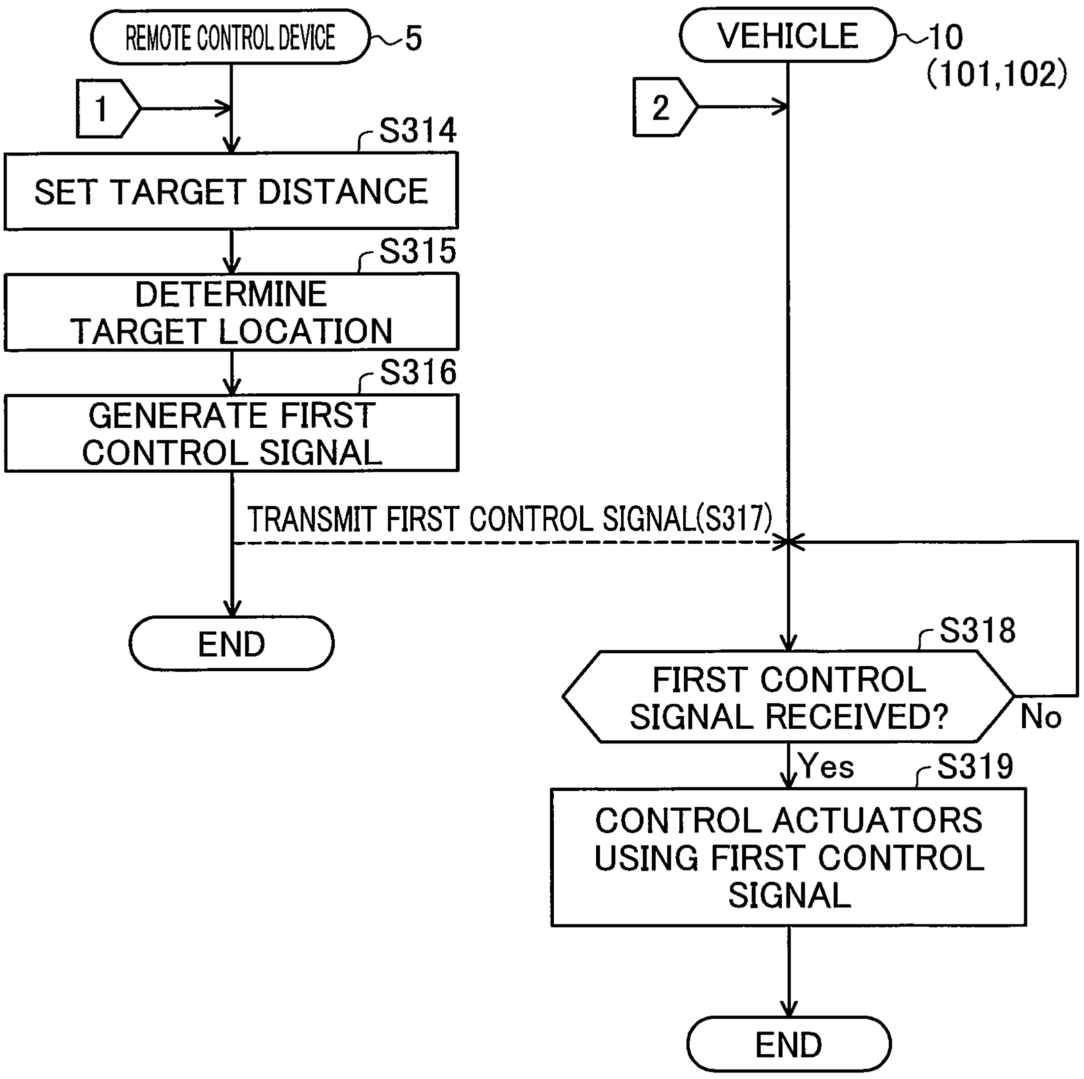
FIG. 6 is a second flowchart showing the first adjustment method.

FIG. 5 is a first flowchart showing a first adjustment method. FIG. 6 is a second flowchart showing the first adjustment method. The first adjustment method is a method to adjust the actual distance Da between the front vehicle 101 and the rear vehicle 102 to the target distance Dg according to the content of the work of the one production step being performed on the vehicle 10.

As shown in FIG. 5, when the predetermined adjustment timing is reached (step S301: Yes), the remote transmission unit 529 of the remote control device 5 performs the following process. In this case, the remote transmission unit 529 transmits a first request signal to the external camera 9, the front vehicle 101, and the rear vehicle 102 (step S302).

In response to the reception of the first request signal (step S303: Yes), the external camera 9 acquires the external camera image (step S304). After the step S304, the external camera 9 transmits the external camera image to the remote control device 5, together with the camera identification information (step S305).

If the state acquisition unit 221 of the vehicle 10 receives the first request signal (step S306: Yes), the state acquisition unit 221 acquires the on-vehicle sensor information acquired by the first type sensor group 26 and the second type sensor group 27 (step S307). After the step S307, the vehicle transmission unit 222 transmits the on-vehicle sensor information to the remote control device 5, together with the vehicle identification information (step S308). Any of the steps from the step S303 to the step S305 and the step S306 to the step S308 may be executed first, or they may be executed concurrently.

After the step S308, the position acquisition unit 520 of the remote control device 5 acquires the vehicle position information (step S309). After the step S309, the speed calculation unit 521 calculates the respective running speeds of the front vehicle 101 and the rear vehicle 102 (step S310). After the step S310, the actual distance calculation unit 522 performs the following process using at least some of the vehicle position information and the running speed of the front vehicle 101 and the vehicle position information and the running speed of the rear vehicle 102. In this case, the actual distance calculation unit 522 calculates the actual distance Da between the front vehicle 101 and the rear vehicle 102 (step S311). After the step S311, the step identification unit 523 identifies the one production step being performed on the front vehicle 101 and the rear vehicle 102 using the on-vehicle camera image and the like (step S312). After the step S312, the step information acquisition unit 524 acquires the production step information with regard to the one production step identified by the step identification unit 523 (step S313).

As shown in FIG. 6, after the step S313, the target setting unit 525 sets the target distance Dg to a distance according to the content of the work of the one production step using the target distance database DB, the production step information, and the like (step S314). After the step S314, the signal generation unit 528 determines the target location using the reference route RR, the actual distance Da between the front vehicle 101 and the rear vehicle 102 and the target distance Dg, the running speeds of the front vehicle 101 and the rear vehicle 102, the target speed, the vehicle position information, and the like (step S315). After the step S315, the signal generation unit 528 generates at least one of the front first control signal and the rear first control signal to enable the vehicle 10 to run toward the determined target location (step S316). After the step S316, the remote transmission unit 529 transmits the first control signal to the vehicle 10 for which the running operation is to be controlled (step S317). That is, the remote transmission unit 529 transmits the front first control signal to the front vehicle 101 and transmits the rear first control signal to the rear vehicle 102.

If the vehicle control device 2 mounted on the vehicle 10 receives the first control signal (step S318: Yes), the operation control unit 223 controls the actuator group 29 using the received first control signal, thereby causing the vehicle 10 to run at the acceleration and the steering angle indicated by the first control signal (step S319).

Figure 7:
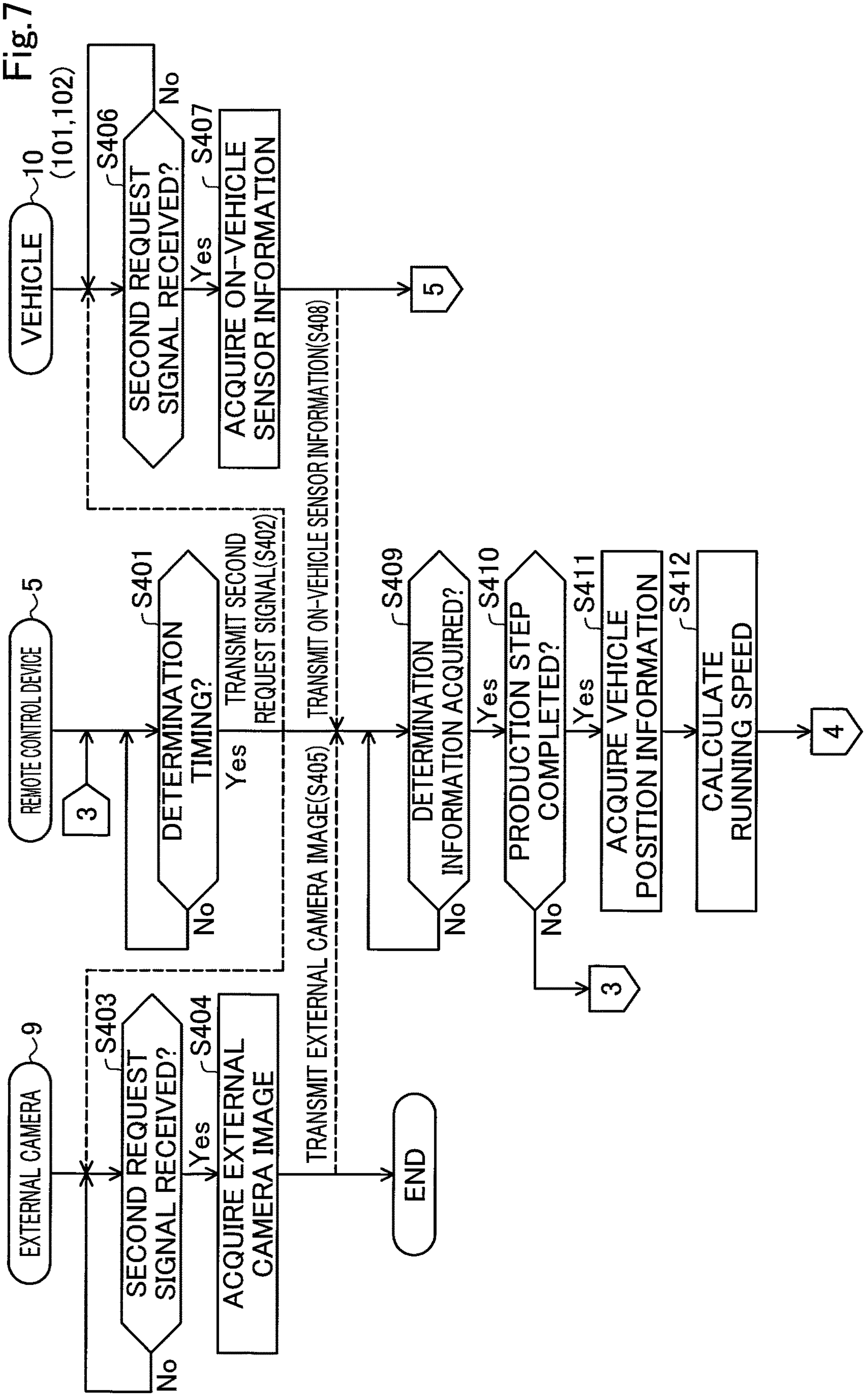
FIG. 7 is a first flowchart showing a second adjustment method.
Figure 8:
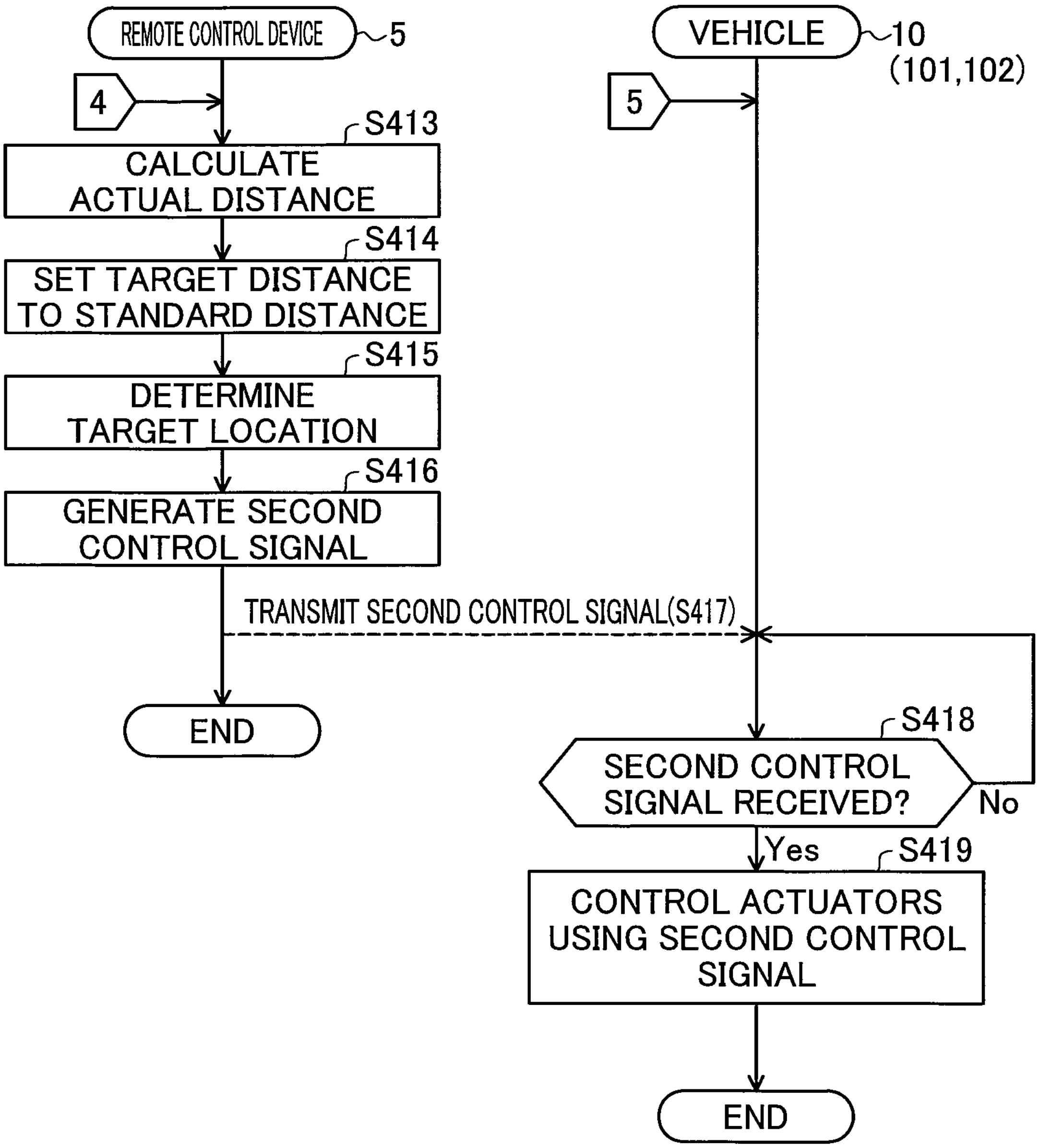
FIG. 8 is a second flowchart showing the second adjustment method.

FIG. 7 is a first flowchart showing a second adjustment method. FIG. 8 is a second flowchart showing the second adjustment method. The second adjustment method is a method to adjust the actual distance Da between the front vehicle 101 and the rear vehicle 102 to the standard distance Ds in the movement process. That is, the second adjustment method is performed after the step S319 of the first adjustment method shown in FIG. 6.

As shown in FIG. 7, when the determination timing is reached (step S401: Yes), the remote transmission unit 529 of the remote control device 5 performs the following process. The determination timing is a timing after the timing when the step S319 of the first adjustment method shown in FIG. 6 is performed. Specifically, the determination timing is, for example, the timing when the elapsed time after the timing of the start of running according to the first control signal becomes equal to or more than a predetermined time, or when a predetermined time has passed after the previous determination timing. In this case, as shown in FIG. 7, the remote transmission unit 529 transmits a second request signal to the external camera 9, the front vehicle 101, and the rear vehicle 102 (step S402).

If the external camera 9 receives the second request signal (step S403: Yes), the external camera 9 acquires the external camera image (step S404). After the step S404, the external camera 9 transmits the external camera image to the remote control device 5, together with the camera identification information (step S405).

If the vehicle control device 2 mounted on the vehicle 10 receives the second request signal (step S406: Yes), the state acquisition unit 221 acquires the on-vehicle sensor information (step S407). After the step S407, the vehicle transmission unit 222 transmits the on-vehicle sensor information to the remote control device 5, together with the vehicle identification information (step S408). Any of the steps from the step S403 to the step S405 and the step S406 to the step S408 may be executed first, or they may be executed concurrently.

If the determination information acquisition unit 526 of the remote control device 5 acquires the determination information (step S409: Yes), the determination unit 527 determines whether or not the one production step identified by the step identification unit 523 has been completed using the determination information (step S410). That is, the determination unit 527 determines whether or not the one production step as the target for the control by the first control signal has been completed. If it is determined by the determination unit 527 that the one production step identified by the step identification unit 523 has been completed (step S410: Yes), the position acquisition unit 520 acquires the vehicle position information (step S411). After the step S411, the speed calculation unit 521 calculates the respective running speeds of the front vehicle 101 and the rear vehicle 102 (step S412). In contrast, if it is determined by the determination unit 527 that the production step identified by the step identification unit 523 has not been completed (step S410: No), the process returns to the step S401 and each step from the step S401 to the step S410 is repeatedly performed.

As shown in FIG. 8, after the step S412, the actual distance calculation unit 522 performs the following process using at least some of the vehicle position information and the running speed of the front vehicle 101 and the vehicle position information and the running speed of the rear vehicle 102. In this case, the actual distance calculation unit 522 calculates the actual distance Da between the front vehicle 101 and the rear vehicle 102 (step S413). After the step S413, the target setting unit 525 sets the target distance Dg between the front vehicle 101 and the rear vehicle 102 to the standard distance Ds (step S414). After the step S414, the signal generation unit 528 determines the target location using the reference route RR, the actual distance Da between the front vehicle 101 and the rear vehicle 102 and the standard distance Ds, the running speeds of the front vehicle 101 and the rear vehicle 102, the target speed, the vehicle position information, and the like (step S415). After the step S415, the signal generation unit 528 generates at least one of the front second control signal and the rear second control signal to enable the vehicle 10 to run toward the determined target location (step S416). After the step S416, the remote transmission unit 529 transmits the second control signal to the vehicle 10 for which the running operation is to be controlled (step S417). That is, the remote transmission unit 529 transmits the front second control signal to the front vehicle 101 and transmits the rear second control signal to the rear vehicle 102.

If the vehicle control device 2 mounted on the vehicle 10 receives the second control signal (step S418: Yes), the operation control unit 223 controls the actuator group 29 using the received second control signal, thereby causing the vehicle 10 to run at the acceleration and the steering angle indicated by the second control signal (step S419).

According to the first embodiment described above, the remote control device 5 is capable of setting the target distance Dg between the front vehicle 101 and the rear vehicle 102 according to the production step information regarding the one production step. Then, the remote control device 5 can adjust the actual distance Da between the front vehicle 101 and the rear vehicle 102 so that the actual distance Da between the front vehicle 101 and the rear vehicle 102 is equal to the target distance Dg, which is set according to the production step information regarding the one production step being performed on the vehicle 10. That is, the remote control device 5 can set the actual distance Da between the front vehicle 101 and the rear vehicle 102, which are running under remote control, to an inter-vehicle distance appropriate for the content of the work of the one production step being performed in the production process. In this way, it is possible to prevent the actual distance Da between the front vehicle 101 and the rear vehicle 102 from unnecessarily being longer than the target distance Dg, which is appropriate for the content of the work of the one production step being performed on the vehicle 10. This reduces the possibility that the actual distance Da between the front vehicle 101 and the rear vehicle 102 becomes longer than necessary and accordingly the time required to produce the vehicle 10 increases. Further, it is also possible to prevent the actual distance Da between the front vehicle 101 and the rear vehicle 102 from unnecessarily being shorter than the target distance Dg, which is appropriate for the content of the work of the one production step being performed on the vehicle 10. This reduces the possibility that the actual distance Da between the front vehicle 101 and the rear vehicle 102 becomes shorter than necessary and accordingly the work during the production of the vehicle 10 is interfered with.

Further, according to the first embodiment described above, the work information included in the production step information includes inter-vehicle work information. This allows the remote control device 5 to set the target distance Dg so that the target distance Dg in a production step in which the inter-vehicle work is performed is longer than the target distance Dg in a production step in which the inter-vehicle work is not performed. That is, in the production steps in which the inter-vehicle work is performed, the actual distance Da between the front vehicle 101 and the rear vehicle 102 may be set to a distance longer than the actual distance Da between the front vehicle 101 and the rear vehicle 102 in a production step in which other work than the inter-vehicle work (e.g., work on the side surface of the vehicle 10) is performed. In this way, it is possible to more reliably ensure a work area in which workers enter to engage in the work between the front vehicle 101 and the rear vehicle 102. This further reduces the possibility of interference with the inter-vehicle work. Further, according to such an embodiment, it is possible to ensure safety when workers perform the inter-vehicle work.

Further, according to the first embodiment described above, when the target distance Dg is longer than the actual distance Da between the front vehicle 101 and the rear vehicle 102, the remote control device 5 is capable of generating the rear first control signal to cause the rear vehicle 102 to perform at least one of the deceleration process and the backing process. In this way, the actual distance Da between the front vehicle 101 and the rear vehicle 102 can be easily increased by controlling at least one of the acceleration and the traveling direction of the rear vehicle 102.

Further, according to the first embodiment described above, when the target distance Dg is longer than the actual distance Da between the front vehicle 101 and the rear vehicle 102, the remote control device 5 is capable of generating the front first control signal to cause the front vehicle 101 to perform the acceleration process. In this way, the actual distance Da between the front vehicle 101 and the rear vehicle 102 can be easily increased by controlling the acceleration of the front vehicle 101. In other words, the actual distance Da between the front vehicle 101 and the rear vehicle 102 can be easily increased by providing a difference in running speed between the front vehicle 101 and the rear vehicle 102.

Further, according to the first embodiment described above, the remote control device 5 is capable of generating and transmitting both the front first control signal and the rear first control signal so as to set the actual distance Da between the front vehicle 101 and the rear vehicle 102 to the target distance Dg. This allows the vehicle control devices 2 of the front vehicle 101 and the rear vehicle 102 that have received the first control signal to respectively control the operation using the first control signal, thereby adjusting the actual distance Da between the front vehicle 101 and the rear vehicle 102 to the target distance Dg. This, for example, reduces the time required for setting the actual distance Da between the front vehicle 101 and the rear vehicle 102 to the target distance Dg, thereby efficiently changing the actual distance Da between the front vehicle 101 and the rear vehicle 102.

Further, according to the first embodiment described above, the remote control device 5 is capable of determining whether or not the one production step being performed on the vehicle 10 has been completed using the determination information. Then, when the remote control device 5 determines that the one production step in which the inter-vehicle work is performed has been completed, the remote control device 5 can adjust the actual distance Da between the front vehicle 101 and the rear vehicle 102 to the standard distance Ds in the movement process. In other words, according to the first embodiment described above, the remote control device 5 is capable of changing the actual distance Da between the front vehicle 101 and the rear vehicle 102 to the standard distance Ds in the movement process after the one production step is completed. This prevents prolonging the actual distance Da between the front vehicle 101 and the rear vehicle 102 more than necessary during the movement process after the production step in which the inter-vehicle work is performed is completed. This allows the vehicle 10 to efficiently move during the movement process.

Further, according to the first embodiment described above, the control system 1 is capable of causing the vehicle 10 to run by unmanned driving in a factory where a plurality of production steps are performed. That is, the control system 1 enables the vehicle 10 to be transported in the factory without using belt conveyers. When a belt conveyer is used to transport the vehicle 10, in some cases, it may be difficult to dynamically change the actual distance Da between the front vehicle 101 and the rear vehicle 102 that are placed on the belt. In this case, if a plurality of production steps are performed on a plurality of vehicles 10 placed on the same belt, the actual distance Da between the front vehicle 101 and the rear vehicle 102 is likely to be set as follows. In this case, the actual distance Da between the front vehicle 101 and the rear vehicle 102 is likely to be set to the inter-vehicle distance according to the content of the work of the production step that requires the longest inter-vehicle distance, from among the plurality of production steps that are performed on the vehicles 10 placed on the same belt. As a result, the actual distance Da between the front vehicle 101 and the rear vehicle 102 may become unnecessarily longer than the inter-vehicle distance appropriate for the content of the work of the production step. In contrast, according to the first embodiment described above, the control system 1 is capable of controlling the running operation of the vehicle 10 without using a belt conveyer, thereby transporting the vehicle 10 in a factory, and also adjusting the actual distance Da between the front vehicle 101 and the rear vehicle 102. This makes it possible to optimize the inter-vehicle distance between the plurality of vehicles 10 during the production process.

B. Second Embodiment

Figure 9:
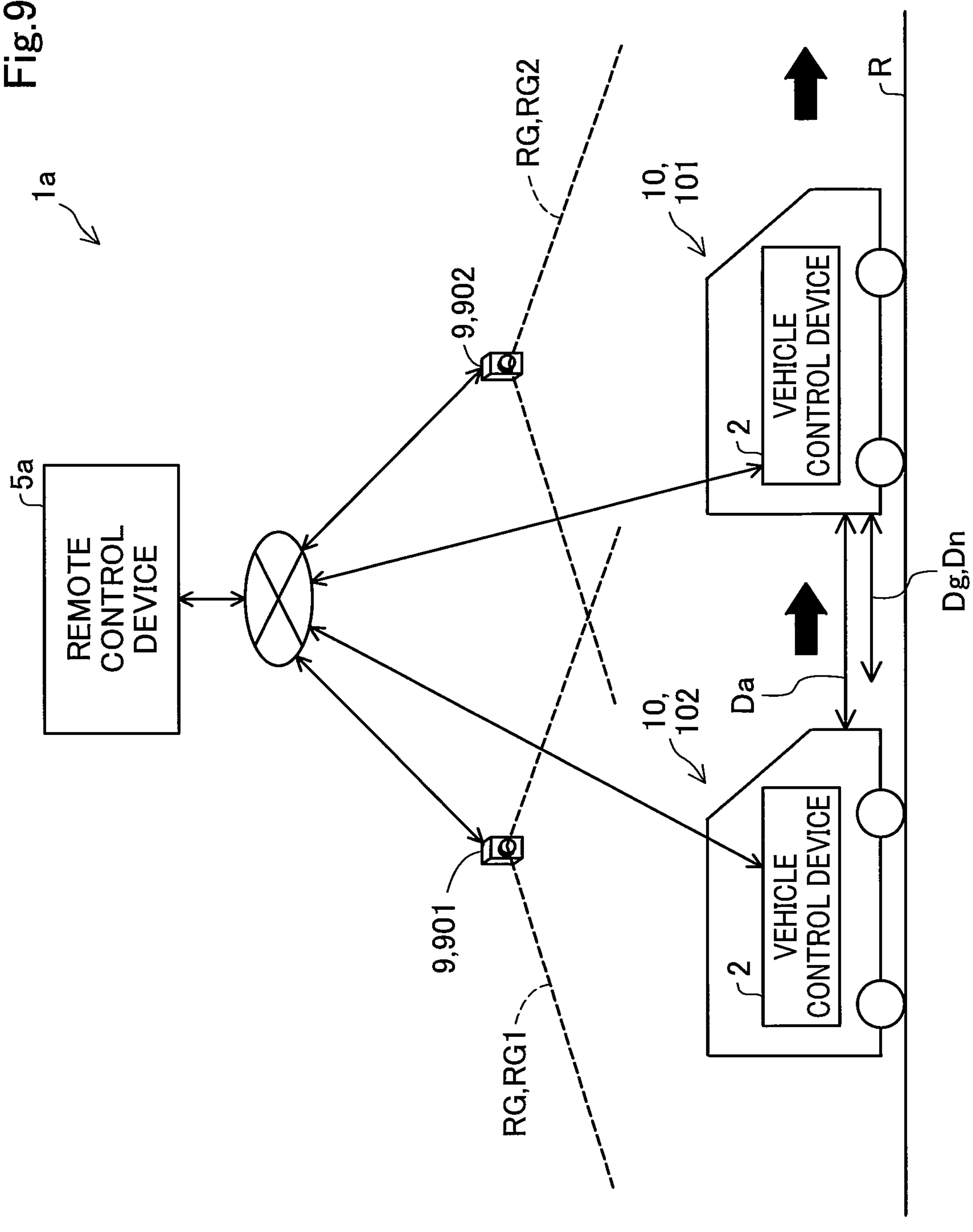
FIG. 9 shows a schematic structure of a control system in a second embodiment.

FIG. 9 shows a schematic structure of a control system 1*a* in the second embodiment. The present embodiment differs from the first embodiment in the control during the movement process. Accordingly, the production process has a movement process in which the vehicle 10 runs between the first work site where the one production step is performed and the second work site where the next production step, which is performed after the one production step, is performed. In the present embodiment, a third adjustment method is performed after the first adjustment method shown in FIGS. 5 and 6. That is, in the present embodiment, the third adjustment method is performed instead of the second adjustment method shown in FIGS. 7 and 8. The third adjustment method is a method to adjust the actual distance Da between the front vehicle 101 and the rear vehicle 102 to a next target distance Dn shown in FIG. 9. The next target distance Dn is the distance between the front vehicle 101 and the rear vehicle 102 according to the next production step information, which is information regarding the next production step. That is, the next target distance Dn is the distance between the front vehicle 101 and the rear vehicle 102 appropriate for the content of the work of the next production step. The rest of the structure of the control system 1*a* is the same as that of the first embodiment, unless otherwise specified. The same structure as that of the first embodiment is described with the same reference symbols and the explanation thereof is omitted.

Figure 10:
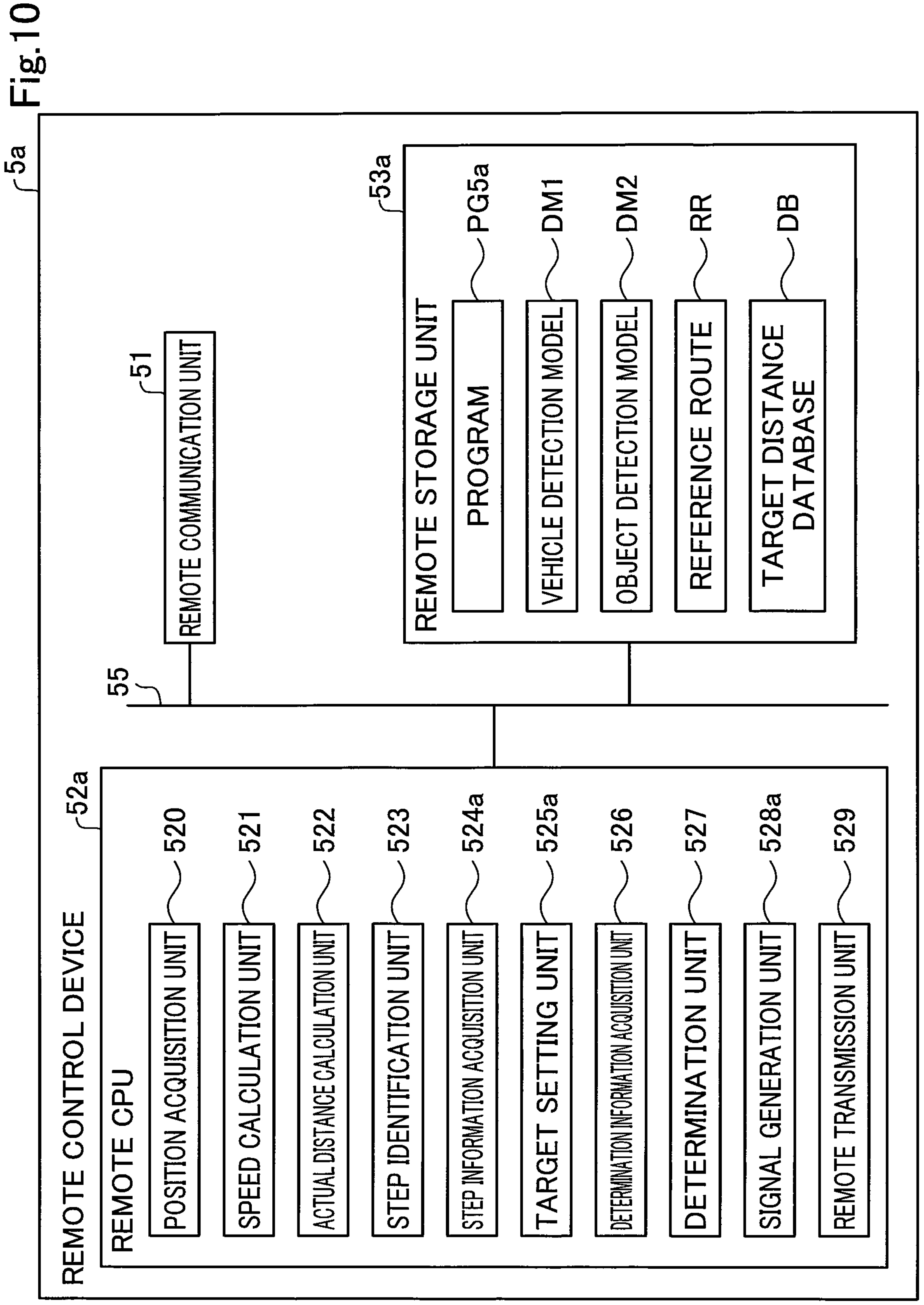
FIG. 10 shows a schematic structure of a remote control device in the second embodiment.

FIG. 10 shows a schematic structure of a remote control device 5*a* in the second embodiment. The remote control device 5*a* includes a remote communication unit 51, a remote CPU 52*a*, and a remote storage unit 53*a*. The remote CPU 52*a* functions as a position acquisition unit 520, a speed calculation unit 521, an actual distance calculation unit 522, a step identification unit 523, a step information acquisition unit 524*a*, and a target setting unit 525*a* by expanding various programs PG5*a* stored in the remote storage unit 53*a*. Furthermore, the remote CPU 52*a* functions as a determination information acquisition unit 526, a determination unit 527, a signal generation unit 528*a*, and a remote transmission unit 529 by expanding the various programs PG5*a* stored in the remote storage unit 53*a*.

The step information acquisition unit 524*a* further acquires the next production step information. When the determination unit 527 determines that the one production step identified by the step identification unit 523 has been completed, the target setting unit 525*a* sets the target distance Dg between the front vehicle 101 and the rear vehicle 102 to the next target distance Dn. The signal generation unit 528*a* performs the following process when the determination unit 527 determines that the one production step identified by the step identification unit 523 has been completed. In this case, the signal generation unit 528*a* generates a running control signal (hereinafter referred to as a third control signal) to set the actual distance Da between the front vehicle 101 and the rear vehicle 102 to the next target distance Dn in the movement process. At this time, the signal generation unit 528 generates at least one of a front third control signal and a rear third control signal. The front third control signal is the third control signal that defines the running operation of the front vehicle 101 in order to set the actual distance Da between the front vehicle 101 and the rear vehicle 102 to the next target distance Dn. The rear third control signal is the third control signal that defines the running operation of the rear vehicle 102 in order to set the actual distance Da between the front vehicle 101 and the rear vehicle 102 to the next target distance Dn.

Figure 11:
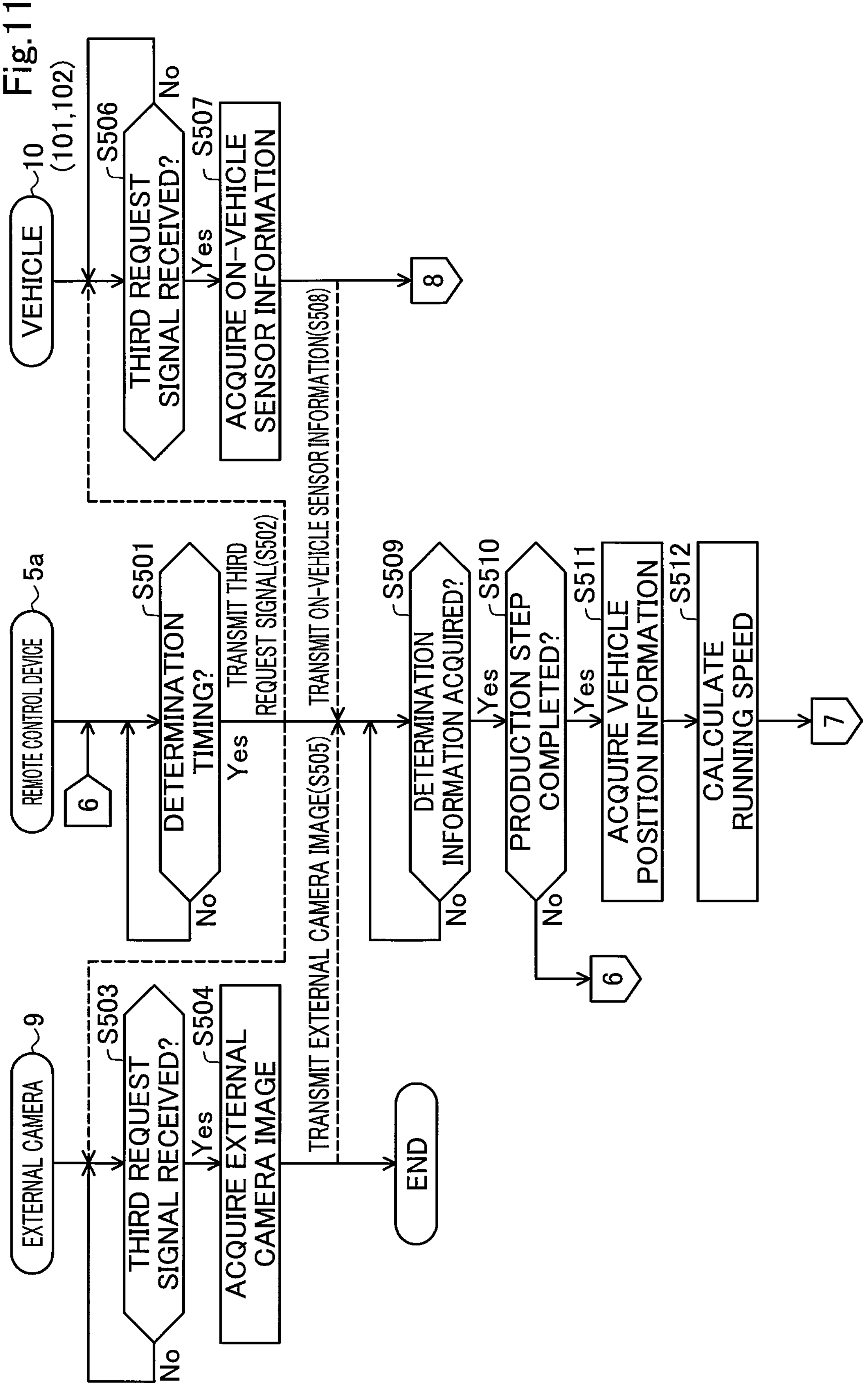
FIG. 11 is a first flowchart showing a third adjustment method.
Figure 12:
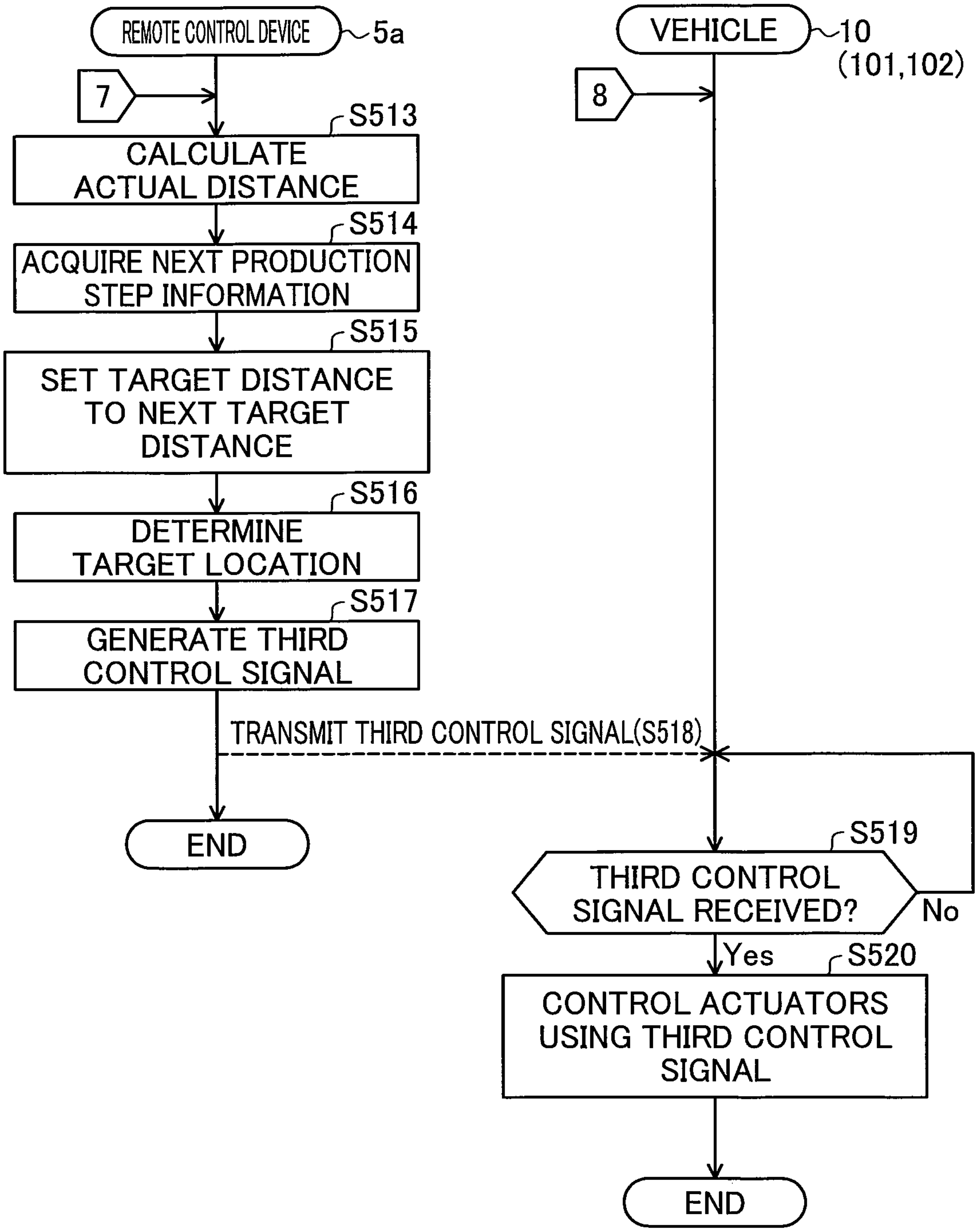
FIG. 12 is a second flowchart showing the third adjustment method.

FIG. 11 is a first flowchart showing the third adjustment method. FIG. 12 is a second flowchart showing the third adjustment method. As mentioned above, the third adjustment method is performed after the step S319 of the first adjustment method shown in FIG. 6.

As shown in FIG. 11, when the determination timing comes (step S501: Yes), the remote transmission unit 529 of the remote control device 5 transmits a third request signal to the external camera 9, the front vehicle 101, and the rear vehicle 102 (step S502).

If the external camera 9 acquires the third request signal (step S503: Yes), the external camera 9 acquires the external camera image (step S504). After the step S504, the external camera 9 transmits the external camera image to the remote control device 5, together with the camera identification information (step S505).

If the vehicle control device 2 mounted on the vehicle 10 receives the third request signal (step S506: Yes), the state acquisition unit 221 acquires the on-vehicle sensor information (step S507). After the step S507, the vehicle transmission unit 222 transmits the on-vehicle sensor information to the remote control device 5, together with the vehicle identification information (step S508). Any of the steps from the step S503 to the step S505 and the step S506 to the step S508 may be executed first, or they may be executed concurrently.

If the determination information acquisition unit 526 of the remote control device 5 acquires the determination information (step S509: Yes), the determination unit 527 determines whether or not the one production step identified by the step identification unit 523 has been completed using the determination information (step S510). If it is determined by the determination unit 527 that the one production step identified by the step identification unit 523 has been completed (step S510: Yes), the position acquisition unit 520 acquires the vehicle position information (step S511). After the step S511, the speed calculation unit 521 calculates the respective running speeds of the front vehicle 101 and the rear vehicle 102 (step S512). In contrast, if it is determined by the determination unit 527 that the one production step identified by the step identification unit 523 has not been completed (step S510: No), the process returns to the step S501 and each step from the step S501 to the step S510 is repeatedly performed.

As shown in FIG. 12, after the step S512, the actual distance calculation unit 522 calculates the actual distance Da between the front vehicle 101 and the rear vehicle 102 (step S513). After the step S513, the step information acquisition unit 524*a* acquires the next production step information (step S514). After the step S514, the target setting unit 525*a* sets the target distance Dg between the front vehicle 101 and the rear vehicle 102 to the next target distance Dn (step S515). After the step S515, the signal generation unit 528*a* determines the target location using the reference route RR, the actual distance Da between the front vehicle 101 and the rear vehicle 102 and the next target distance Dn, the running speeds of the front vehicle 101 and the rear vehicle 102, the target speed, the vehicle position information, and the like (step S516). After the step S516, the signal generation unit 528*a* generates at least one of the front third control signal and the rear third control signal to enable the vehicle 10 to run toward the determined target location (step S517). After the step S517, the remote transmission unit 529 transmits the third control signal to the vehicle 10 for which the running operation is to be controlled in the movement process (step S518).

If the vehicle control device 2 mounted on the vehicle 10 receives the third control signal (step S519: Yes), the operation control unit 223 controls the actuator group 29 using the received third control signal, thereby causing the vehicle 10 to run at the acceleration, etc. indicated by the third control signal (step S520).

According to the second embodiment described above, when the determination unit 527 determines that the one production step identified by the step identification unit 523 has been completed, the actual distance Da between the front vehicle 101 and the rear vehicle 102 can be adjusted to the next target distance Dn in the movement process. That is, after the one production step is completed, the actual distance Da between the front vehicle 101 and the rear vehicle 102 can be adjusted in advance, i.e., before the next production step begins, to an inter-vehicle distance appropriate for the content of the work of the next production step. This makes it possible to optimize the actual distance Da between the front vehicle 101 and the rear vehicle 102 while the vehicle 10 is running on the track R between the work sites where the one production step and the next production step are performed. Therefore, at the time when the next production step begins, the actual distance Da between the front vehicle 101 and the rear vehicle 102 is the inter-vehicle distance according to the content of the work of the next production step. This improves the work efficiency and the safety of the workers in the next production step.

C. Third Embodiment

Figure 13:
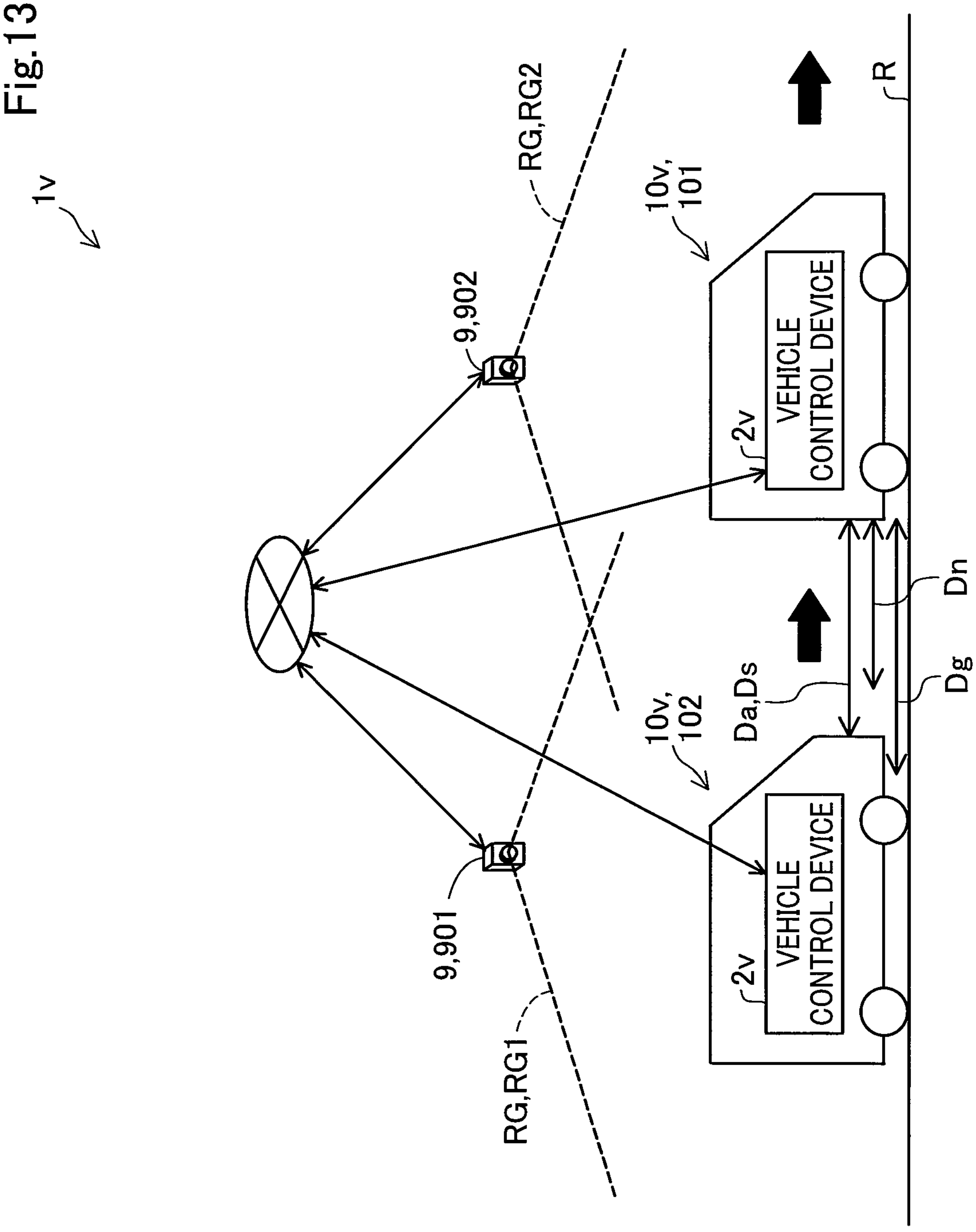
FIG. 13 shows a schematic structure of a control system in the third embodiment.

FIG. 13 shows a schematic structure of a control system 1*v* in the third embodiment. The present embodiment differs from the first embodiment in that the control system 1*v* does not include the remote control device 5. Further, a vehicle 10*v* in the present embodiment is capable of running by autonomous control of the vehicle 10*v*. The rest of the structure of the control system 1*v* is the same as that of the first embodiment, unless otherwise specified. The same structure as that of the first embodiment is described with the same reference symbols and the explanation thereof is omitted.

Figure 14:
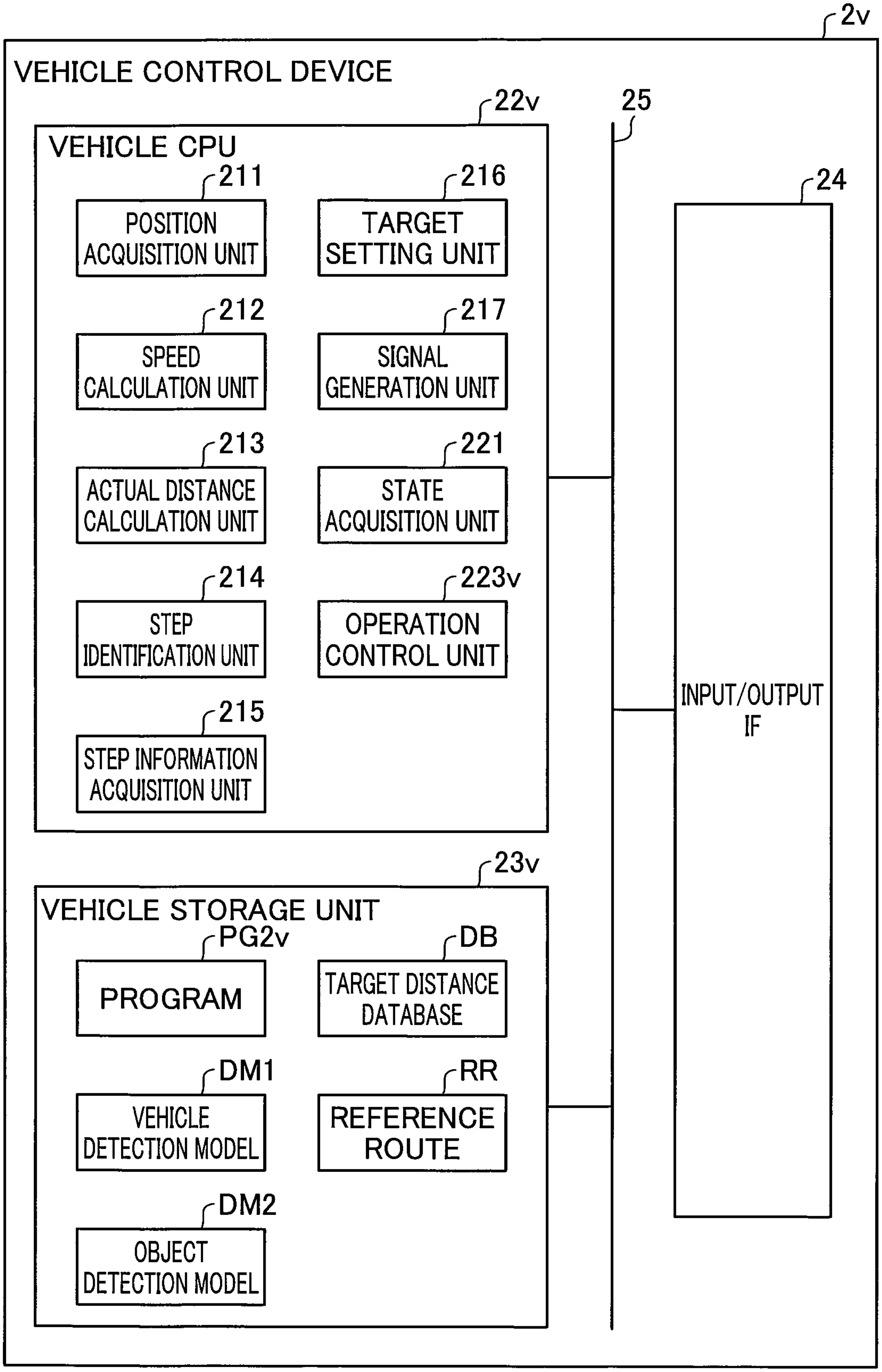
FIG. 14 shows a schematic structure of a vehicle control device in the third embodiment.

FIG. 14 shows a schematic structure of a vehicle control device 2*v* in the third embodiment. FIG. 14 shows a part that represents the structure of the vehicle 10*v*. The vehicle control device 2*v* includes a vehicle storage unit 23*v* as the storage unit of the vehicle control device 2*v*, a vehicle CPU 22*v* as the central processing unit of the vehicle control device 2*v*, and an input/output interface 24.

The vehicle storage unit 23*v* stores various types of information, including various programs PG2*v* that control the running operation of the vehicle 10*v*, a vehicle detection model DM1, an object detection model DM2, a target distance database DB, and a reference route RR. The vehicle storage unit 23 includes, for example, RAM, ROM, a hard disk drive (HDD) and the like.

The vehicle CPU 22*v* functions as a position acquisition unit 211, a speed calculation unit 212, an actual distance calculation unit 213, and a step identification unit 214 by expanding the various programs PG2*v* stored in the vehicle storage unit 23*v*. Furthermore, the vehicle CPU 22*v* functions as a step information acquisition unit 215, a target setting unit 216, a signal generation unit 217, the state acquisition unit 221, and an operation control unit 223*v* by expanding the various programs PG2*v* stored in the vehicle storage unit 23*v*.

The position acquisition unit 211 acquires vehicle position information using detection results output from the external sensors. In the present embodiment, the position acquisition unit 211 acquires the vehicle position information using detection results output from the external camera 9, which is an external sensor. The speed calculation unit 212 calculates the running speed of the vehicle 10*v*, which is the own vehicle. The speed calculation unit 521 may acquire the running speed of another vehicle 10*v* from the another vehicle 10*v*. The another vehicle 10*v* is a vehicle different from the own vehicle 10*v* and runs at least one of the front and rear of the own vehicle 10*v*. The actual distance calculation unit 213 calculates the actual distance Da between the own vehicle 10*v* and the another vehicle 10*v*. The step identification unit 214 identifies, from among a plurality of production steps in the production process, one production step that is being performed on the vehicle 10*v*, which is at least one of the own vehicle 10*v* and the another vehicle 10*v*. The step information acquisition unit 215 acquires the production step information regarding the one production step being performed on the vehicle 10*v*, which is at least one of the own vehicle 10*v* and the another vehicle 10*v*. The target setting unit 216 sets the target distance Dg between the own vehicle 10*v* and the another vehicle 10*v* according to the production process. The signal generation unit 217 generates various running control signals to set the actual distance Da between the own vehicle 10*v* and the another vehicle 10*v* to the target distance Dg. Specifically, the signal generation unit 217 first determines the target location to which the own vehicle 10*v* is supposed to go next. Then, the signal generation unit 217 generates a running control signal to cause the own vehicle 10*v* to run toward the determined target location. The operation control unit 223*v* controls the actuator group 29 using the generated running control signal, thereby causing the own vehicle 10*v* to run according to the parameters indicated by the running control signal. The vehicle control device 2*v* repeats the acquisition of the vehicle position information, the determination of the target location, the generation of the running control signal, and the control of the actuators, in a predetermined cycle.

Figure 15:
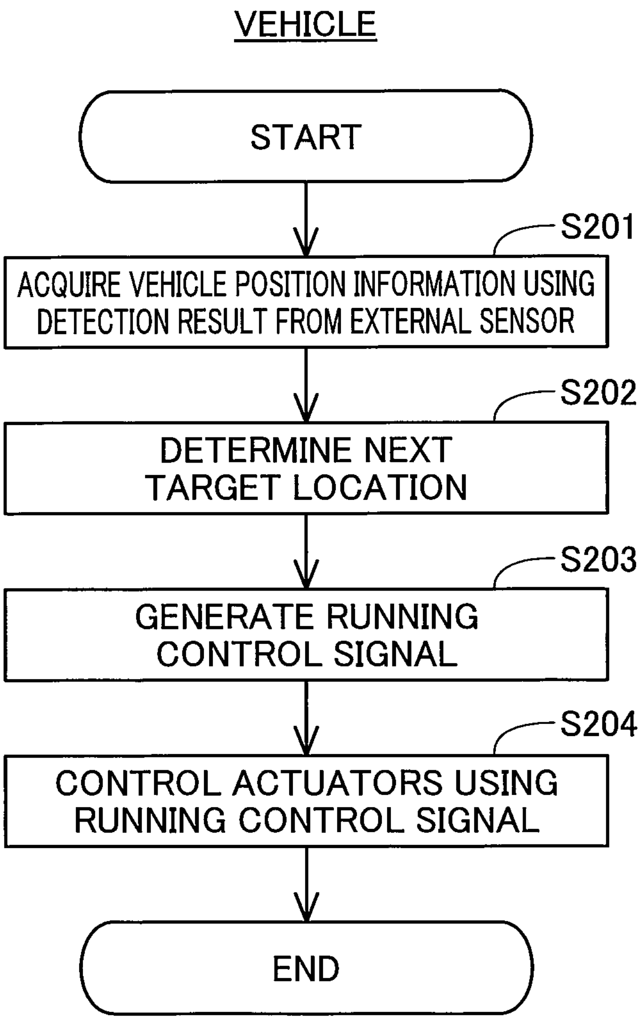
FIG. 15 is a flowchart of procedures in the process of running control of a vehicle in the third embodiment.

FIG. 15 is a flowchart of procedures in the process of running control of the vehicle 10*v* in the third embodiment. The flow shown in FIG. 15 is repeated, for example, every predetermined time from the time point at which the running of the vehicle 10*v* by unmanned driving is started.

In the step S201, the position acquisition unit 211 of the vehicle control device 2*v* acquires the vehicle position information using the detection result output from the external camera 9. In the step S202, the signal generation unit 217 determines the target location to which the vehicle 10*v* should go next. In the step S203, the signal generation unit 217 generates a running control signal to cause the vehicle 10*v* to run toward the determined target location. In the step S204, the operation control unit 223*v* controls the actuator group 29 using the generated running control signal, thereby causing the vehicle 10*v* to run according to the parameters indicated by the running control signal.

According to the third embodiment described above, the control system 1*v* is capable of causing the vehicle 10*v* to run by autonomous control of the vehicle 10*v* without remote control of the vehicle 10*v* by the remote control device 5.

Further, according to the third embodiment described above, the vehicle control device 2*v* is capable of setting the target distance Dg between the own vehicle 10*v* and the another vehicle 10*v* according to the production step information regarding the one production step. This enables adjustment of the actual distance Da between the own vehicle 10*v* and the another vehicle 10*v* so that the actual distance Da between the own vehicle 10*v* and the another vehicle 10*v* becomes the target distance Dg according to the production step information. This enables adjustment of the actual distance Da between the own vehicle 10*v* and the another vehicle 10*v* to an inter-vehicle distance appropriate for the content of the work of the one production step. Therefore, it is possible to prevent the actual distance Da between the own vehicle 10*v* and the another vehicle 10*v* from being unnecessarily longer than the target distance Dg. This reduces the possibility that the actual distance Da between the own vehicle 10*v* and the another vehicle 10*v* becomes longer than necessary and accordingly the time required to produce the vehicle 10*v* increases. Further, it is also possible to prevent the actual distance Da between the own vehicle 10*v* and the another vehicle 10*v* from being unnecessarily shorter than the target distance Dg. This reduces the possibility that the actual distance Da between the own vehicle 10*v* and the another vehicle 10*v* becomes shorter than necessary and accordingly the work during the production of the vehicle 10*v* is interfered with.

Further, in the third embodiment described above, the vehicle control device 2*v* may set the target distance Dg so that the target distance Dg in a production step in which the inter-vehicle work is performed is longer than the target distance Dg in a production step in which the inter-vehicle work is not performed. In this way, it is possible to more reliably ensure a work area in which workers enter to engage in the work between the own vehicle 10*v* and the another vehicle 10*v*. This reduces the possibility of interference during the inter-vehicle work and also ensures safety when workers are engaged in the inter-vehicle work.

Further, in the third embodiment described above, when the target distance Dg is longer than the actual distance Da between the own vehicle 10*v* and the another vehicle 10*v* and when the own vehicle 10*v* is running behind the another vehicle 10*v*, the vehicle control device 2*v* may generate the following first control signal. In this case, the vehicle control device 2*v* may generate a first control signal to cause the own vehicle 10*v* to perform at least one of the deceleration process and the backing process. In this way, the actual distance Da between the own vehicle 10*v* and the another vehicle 10*v* can be increased by controlling one of the acceleration and the traveling direction of the own vehicle 10*v*.

Further, in the third embodiment described above, when the target distance Dg is longer than the actual distance Da between the own vehicle 10*v* and the another vehicle 10*v* and when the own vehicle 10*v* is running ahead of the another vehicle 10*v*, the vehicle control device 2*v* may generate the following first control signal. In this case, the vehicle control device 2*v* may generate a first control signal to cause the own vehicle 10*v* to perform the acceleration process. In this way, the actual distance Da between the own vehicle 10*v* and the another vehicle 10*v* can be increased by controlling the acceleration of the own vehicle 10*v*.

Further, in the third embodiment described above, the vehicle control device 2*v* may further include the determination information acquisition unit 526 and the determination unit 527. Then, when it is determined that the one production step in which inter-vehicle work is performed has been completed, the vehicle control device 2*v* may generate the following second control signal. In this case, the vehicle control device 2*v* may generate a second control signal to define the operation of the own vehicle 10*v* to set the actual distance Da between the own vehicle 10*v* and the another vehicle 10*v* to the standard distance Ds as the target distance Dg in the movement process. In this way, the vehicle control device 2*v* can determine whether or not the one production step that is being performed on at least one of the own vehicle 10*v* and the another vehicle 10*v*, and that involves inter-vehicle work has been completed. Then, if it is determined that the one production step in which inter-vehicle work is performed has been completed, the vehicle control device 2*v* can set the target distance Dg between the own vehicle 10*v* and the another vehicle 10*v* to the standard distance Ds that is shorter than the target distance Dg when inter-vehicle work is performed. In this way, when it is determined that the one production step in which inter-vehicle work is performed has been completed, the vehicle control device 2*v* can adjust the actual distance Da between the own vehicle 10*v* and the another vehicle 10*v* so that the actual distance Da between the own vehicle 10*v* and the another vehicle 10*v* becomes the standard distance Ds in the movement process. This prevents the actual distance Da between the own vehicle 10*v* and the another vehicle 10*v* from being longer than necessary after the completion of the one production step.

Further, in the third embodiment described above, the vehicle control device 2*v* may further include the determination information acquisition unit 526 and the determination unit 527. Then, when it is determined that the one production step has been completed, the vehicle control device 2*v* may generate the following third control signal. In this case, the vehicle control device 2*v* may generate a third control signal to define the operation of the own vehicle 10*v* to set the actual distance Da between the own vehicle 10*v* and the another vehicle 10*v* to the next target distance Dn as the target distance Dg in the movement process. In this way, the vehicle control device 2*v* can determine whether or not the one production step that is being performed on at least one of the own vehicle 10*v* and the another vehicle 10*v* has been completed. Then, if it is determined that the one production step has been completed, the vehicle control device 2*v* can set the target distance Dg between the own vehicle 10*v* and the another vehicle 10*v* to the next target distance Dn according to the next production step information. This allows the vehicle control device 2*v* to adjust the actual distance Da between the own vehicle 10*v* and the another vehicle 10*v* to the next target distance Dn in the movement process when it is determined that the one production step has been completed. This enables adjustment of the actual distance Da between the own vehicle 10*v* and the another vehicle 10*v* to an inter-vehicle distance appropriate for the content of the work of the next production step in advance before the start of the next production step.

D. Alternative Embodiments

D-1. Alternative Embodiment 1

In an alternative embodiment, when the inter-vehicle work is an assembly work to assemble a communicable device to the vehicle 10, 10*v*, the determination information may include communicability information. The communicability information indicates whether or not the communicable device is capable of communication with the outside of the vehicle 10, 10*v*. In this case, if the communicable device is capable of communication with the outside of the vehicle 10, 10*v*, the control system 1, 1*a*, 1*v* determines that the one production step in which inter-vehicle work is performed has been completed. On the other hand, if the communicable device is incapable of communication with the outside of the vehicle 10, the control system 1, 1*a*, 1*v* determines that the one production step in which inter-vehicle work is performed has not been completed. In such an embodiment, the control system 1, 1*a*, 1*v* can determine whether or not the one production step has been completed by using the availability of communication between the communicable device and the outside of the vehicle 10, 10*v*.

D-2. Alternative Embodiment 2

In an alternative embodiment, the control system 1, 1*a*, 1*v* may generate a second control signal to adjust the actual distance Da between the front vehicle 101 and the rear vehicle 102 to the standard distance Ds during the movement process in which the vehicle 10, 10*v* runs from the work site where the final production step was performed to the storage place after the all production steps are completed. The storage place is, for example, a yard. In this case, the production step information includes final step information that indicates whether or not the production step identified by the production step identification information is the final production step from among a plurality of production steps in the production process. The control system 1, 1*a*, 1*v* determines whether or not the one production step has been completed and whether or not the one production step is the final production step from among the plurality of production steps in the production process by using the production step information and the determination information. Then, when it is determined that the final production step of the production process has been completed, the control system 1, 1*a*, 1*v* generates the second control signal without newly identifying the production step or newly acquiring the production step information. In such an embodiment, the control system 1, 1*a*, 1*v* can adjust the actual distance Da between the front vehicle 101 and the rear vehicle 102 to the standard distance Ds during the movement process in which the vehicle 10, 10*v* runs from the work site where the final production step is performed to the storage place. This prevents prolonging the actual distance Da between the front vehicle 101 and the rear vehicle 102 more than necessary during the movement process. This allows the vehicle 10, 10*v* to efficiently move from the work site where the final production step is performed to the storage place.

D-3. Alternative Embodiment 3

In an alternative embodiment, the determination information may include input information that is input by a worker via an input device (not shown) when the production step is completed. The input device is, for example, a tablet terminal or mobile terminal that can be carried by workers, or a push-button switch or lever switch pre-installed in the work site where the production step is performed. In this case, the control system 1, 1*a*, 1*v* determines that the one production step being performed on the vehicle 10, 10*v* has been completed, for example, when the input information has been received. On the other hand, the control system 1, 1*a*, 1*v* determines that the one production step being performed on the vehicle 10, 10*v* has not been completed when no input information has been received. In such an embodiment, it is possible to determine whether or not the one production step has been completed without performing image analysis of the external camera images or the on-vehicle camera images in the control system 1, 1*a*, 1*v*. This reduces the processing load on the control system 1, 1*a*, 1*v*.

D-4. Alternative Embodiment 4

In an alternative embodiment, the determination information may include at least one of on-vehicle radar information acquired by the on-vehicle radar 262 mounted on the vehicle 10, 10*v*, and on-vehicle LiDAR information acquired by the on-vehicle LIDAR 263 mounted on the vehicle 10, 10*v*. In this case, if an object is detected by the on-vehicle radar 262 or the on-vehicle LiDAR 263 within the area surrounding the front vehicle 101 and the rear vehicle 102, the control system 1, 1*a*, 1*v* determines that the one production step being performed on the vehicle 10, 10*v* has not been completed. On the other hand, if no object is detected by the on-vehicle radar 262 or the on-vehicle LiDAR 263 within the area surrounding the front vehicle 101 and the rear vehicle 102, the control system 1, 1*a*, 1*v* determines that the one production step being performed on the vehicle 10, 10*v* has been completed. In such an embodiment, the control system 1, 1*a*, 1*v* can determine whether or not the one production step has been completed by using the detection results output from at least one of the on-vehicle radar 262 and the on-vehicle LiDAR 263.

D-5. Alternative Embodiment 5

In an alternative embodiment, the control system 1, 1*a*, 1*v* may identify the one production step being performed on the vehicle 10, 10*v* by matching the vehicle position information with information (hereinafter referred to as "work site location information") indicating the location of the work site where each production step is performed. In this case, the work site location information is, for example, map data in which the coordinate value indicating the location of each work site is associated with the production step identification information that identifies the production step on a map of the entire factory. Further, the work site location information may also be table data in which the coordinate value indicating the location of each work site is associated with the production step identification information for each production step. In such an embodiment, the control system 1, 1*a*, 1*v* can identify the one production step that is being performed on the vehicle 10, 10*v* using the vehicle position information.

D-6. Alternative Embodiment 6

In an alternative embodiment, the control system 1, 1*a*, 1*v* may identify the one production step that is being performed on the vehicle 10, 10*v* by using communication between the vehicle 10, 10*v* and the outside of the vehicle 10, 10*v*. In this case, the vehicle 10, 10*v* receives, for example, radio waves emitted from transmitters installed at the work site where each production step is performed. The radio waves have a different frequency for each production step. Then, the control system 1, 1*a*, 1*v* identifies the one production step being performed on the vehicle 10, 10*v* based on the frequency information. In such an embodiment, the one production step that is being performed on the vehicle 10, 10*v* can be identified by the communication between the vehicle 10, 10*v* and the outside of the vehicle 10, 10*v*.

D-7. Alternative Embodiment 7

In an alternative embodiment, the external sensor may not be a camera, but may be, for example, a LiDAR (Light Detection And Ranging). In this case, the detection results output by the external sensor may be 3D point cloud data representing the vehicle 10, 10*v*. In this case, the remote control device 5, 5*a* or the vehicle 10, 10*v* may acquire the vehicle position information by template matching using the 3D point cloud data as the detection result and the reference point cloud data prepared in advance.

D-8. Alternative Embodiment 8

In an alternative embodiment, the vehicle position information may be acquired by using information acquired by a position information reception unit (not shown) mounted on the vehicle 10, 10*v*. In this case, the vehicle 10, 10*v* is equipped with, as the first type sensor 260, the position information reception unit, which is, for example, a GNSS receiver or the like capable of receiving radio waves transmitted from a GNSS satellite. Further, in an alternative embodiment, the vehicle position information may be acquired by using at least one of the on-vehicle camera images acquired by the on-vehicle camera 261, the on-vehicle radar information acquired by the on-vehicle radar 262, and the on-vehicle LiDAR information acquired by the on-vehicle LiDAR 263. Also in such an embodiment, the control system 1, 1*a*, 1*v* can change the actual distance Da between the front vehicle 101 and the rear vehicle 102 to the target distance Dg using the vehicle position information, and the like.

D-9. Alternative Embodiment 9

In the embodiments described above, the production process has a movement process. In contrast, in an alternative embodiment, the production process may not have a movement process. The case in which the production process does not have a movement process is the case in which the one production step and the next production step are successively performed, for example, in the first work site and the second work site, which are located in the same building. In this case, none of the second adjustment method shown in FIGS. 7 and 8 and the third adjustment method shown in FIGS. 11 and 12 are performed after the first adjustment method shown in FIGS. 5 and 6, and the first adjustment method is repeated for each production step. Also in such an embodiment, the control system 1, 1*a*, 1*v* can adjust the actual distance Da between the front vehicle 101 and the rear vehicle 102 to the target distance Dg according to the content of the work of the production step.

D-10. Alternative Embodiment 10

In the first and second embodiments described above, the processes from the acquisition of the vehicle position information to the generation of the running control signals are performed by the remote control device 5, 5*a*. In contrast, at least a part of the processes from the acquisition of the vehicle position information to the generation of the running control signals may be performed by the vehicle 10. Examples include the following (1) to (3).

(1) The remote control device 5,5*a* may acquire vehicle location information, determine a target location to which the vehicle 10 is to move next, and generate a route from a current location of the vehicle 10 indicated by the acquired vehicle location information to the target location. The remote control device 5,5*a* may generate a route to the target location between the current location and a destination or generate a route to the destination. The remote control device 5,5*a* may transmit the generated route to the vehicle 10. The vehicle 10 may generate a running control signal in such a manner as to cause the vehicle 10 to run along the route received from the remote control device 5,5*a* and control the actuator group 29 using the generated running control signal.

(2) The remote control device 5,5*a* may acquire vehicle location information and transmit the acquired vehicle location information to the vehicle 10. The vehicle 10 may determine a target location to which the vehicle 10 is to move next, generate a route from a current location of the vehicle 10 indicated by the received vehicle location information to the target location, generate a running control signal in such a manner as to cause the vehicle 10 to run along the generated route, and control an actuator using the generated running control signal.

(3) In the foregoing embodiments (1) and (2), an internal sensor may be mounted on the vehicle 10, and detection result output from the internal sensor may be used in at least one of the generation of the route and the generation of the running control signal. The internal sensor is a sensor mounted on the vehicle 10. More specifically, the internal sensor might include a camera, LiDAR, a millimeter wave radar, an ultrasonic wave sensor, a GPS sensor, an acceleration sensor, and a gyroscopic sensor, for example. For example, in the foregoing embodiment (1), the remote control device 5,5*a* may acquire detection result from the internal sensor, and in generating the route, may reflect the detection result from the internal sensor in the route. In the foregoing embodiment (1), the vehicle 10 may acquire detection result from the internal sensor, and in generating the running control signal, may reflect the detection result from the internal sensor in the running control signal. In the foregoing embodiment (2), the vehicle 10 may acquire detection result from the internal sensor, and in generating the route, may reflect the detection result from the internal sensor in the route. In the foregoing embodiment (2), the vehicle 10 may acquire detection result from the internal sensor, and in generating the running control signal, may reflect the detection result from the internal sensor in the running control signal.

D-11. Alternative Embodiment 11

In the above-described third embodiment, the vehicle 10*v* may be equipped with the internal sensor, and the detection results output from the internal sensor may be used for at least one of the generation of the route and the generation of the running control signals. For example, the vehicle 10*v* may acquire detection result from the internal sensor, and in generating the route, may reflect the detection result from the internal sensor in the route. The vehicle 10*v* may acquire detection result from the internal sensor, and in generating the running control signal, may reflect the detection result from the internal sensor in the running control signal.

D-12. Alternative Embodiment 12

In the above-described third embodiment, h the vehicle 10*v* can be running by autonomous control, the vehicle 10*v* acquires vehicle location information using detection result from the external sensor. By contrast, the vehicle 10*v* may be equipped with an internal sensor, the vehicle 10*v* may acquire vehicle location information using detection result from the internal sensor, determine a target location to which the vehicle 10*v* is to move next, generate a route from a current location of the vehicle 10*v* indicated by the acquired vehicle location information to the target location, generate a running control signal for running along the generated route, and control the actuator group of the vehicle 10*v* using the generated running control signal. In this case, the vehicle 10*v* is capable of running without using any detection result from an external sensor. The vehicle 10*v* may acquire target arrival time or traffic congestion information from outside the vehicle 10*v* and reflect the target arrival time or traffic congestion information in at least one of the route and the running control signal. The functional configuration of the control system 1,1*a*, 1*v* may be entirely provided at the vehicle 10,10*v*. Specifically, the processes realized by the control system 1,1*a*, 1*v* in the present disclosure may be realized by the vehicle 10,10*v* alone.

D-13. Alternative Embodiment 13

In the above-described first embodiment, the remote control device 5, 5*a* automatically generates a running control signal to be transmitted to the vehicle 10. By contrast, the remote control device 5, 5*a* may generate a running control signal to be transmitted to the vehicle 10 in response to operation by an external operator existing outside the vehicle 10. For example, the external operator may operate an operating device including a display on which a captured image output from the external sensor is displayed, steering, an accelerator pedal, and a brake pedal for operating the vehicle 10 remotely, and a communication device for making communication with the remote control device 5, 5*a* through wire communication or wireless communication, for example, and the remote control device 5, 5*a* may generate a running control signal responsive to the operation on the operating device.

D-14. Alternative Embodiment 14

In the alternative embodiment 13 described above, the display of the operating device may display inter-vehicle adjustment information for adjusting the inter-vehicle distance. The inter-vehicle adjustment information includes, for example, an instruction for increasing or decreasing the actual distance Da according to the target distance Dg by an operation by an external operator. The instruction is, for example, a message saying "please increase the inter-vehicle distance", to the external operator. The inter-vehicle adjustment information may include specific numerical information such as the current actual distance Da and the target distance Dg. In such an embodiment, the control system 1, 1*a*, 1*v* can adjust the inter-vehicle distance between the vehicles 10, 10*v* by remote control according to operations by the external operator.

D-15. Alternative Embodiment 15

In the alternative embodiment 13 described above, the control system 1, 1*a*, 1*v* may cause the vehicle 10, 10*v* to run using modified control signals so as to adjust the actual distance Da between the front vehicle 101 and the rear vehicle 102 to the target distance Dg. The modified control signal is a running control signal generated by modifying the value of each parameter of the manual control signal. The manual control signal is a running control signal generated according to an operation applied to the operating device. The control system 1, 1*a*, 1*v*, for example, sets an upper limit value for each parameter included in the manual control signal, and modifies the manual control signal so that the value of each parameter included in the manual control signal is equal to or less than the specified upper limit value. Such an embodiment makes it possible to avoid abrupt changes in the running operation of the vehicle 10, 10*v* during the adjustment of the inter-vehicle distance. Further, the control system 1, 1*a*, 1*v*, for example, sets a lower limit value for each parameter included in the manual control signal, and modifies the manual control signal so that the value of each parameter included in the manual control signal is equal to or more than the specified lower limit value. Such an embodiment makes it possible to efficiently change the inter-vehicle distance.

D-16. Alternative Embodiment 16

In the alternative embodiment 13 described above, the control system 1, 1*a*, 1*v* may cause the vehicle 10, 10*v* to run using alternative control signals so as to adjust the actual distance Da between the front vehicle 101 and the rear vehicle 102 to the target distance Dg. The alternative control signal is a running control signal that is used in place of the manual control signal and is automatically generated by the remote control device 5, 5*a*. In such an embodiment, the running of the vehicle 10, 10*v* can be assisted when the running of the vehicle 10, 10*v* becomes defective due to an operational error by an external operator during the adjustment of the inter-vehicle distance.

D-17. Alternative Embodiment 17

In each of the above-described embodiments, the vehicle 10,10*v* is simply required to have a configuration to become movable by unmanned driving. The vehicle 10 may embodied as a platform having the following configuration, for example. The vehicle 10,10*v* is simply required to include at least actuators and a controller. More specifically, in order to fulfill three functions including "run," "turn," and "stop" by unmanned driving, the actuators may include a driving device, a steering device and a braking device. The actuators are controlled by the controller that controls running of the vehicle 10,10*v*. In order for the vehicle 10,10*v* to acquire information from outside for unmanned driving, the vehicle 10,10*v* is simply required to include the vehicle communication device 21 further. Specifically, the vehicle 10,10*v* to become movable by unmanned driving is not required to be equipped with at least some of interior components such as a driver's seat and a dashboard, is not required to be equipped with at least some of exterior components such as a bumper and a fender or is not required to be equipped with a bodyshell. In such cases, a remaining component such as a bodyshell may be mounted on the vehicle 10,10*v* before the vehicle 10,10*v* is shipped from a factory, or a remaining component such as a bodyshell may be mounted on the vehicle 10,10*v* after the vehicle 10,10*v* is shipped from a factory while the remaining component such as a bodyshell is not mounted on the vehicle 10,10*v*. Each of components may be mounted on the vehicle 10,10*v* from any direction such as from above, from below, from the front, from the back, from the right, or from the left. Alternatively, these components may be mounted from the same direction or from respective different directions. The location determination for the platform may be performed in the same way as for the vehicle 10 in the first embodiments.

D-18. Alternative Embodiment 18

The vehicle 10,10*v* may be manufactured by combining a plurality of modules. The module means a unit composed of multiple components grouped according to a configuration or function of the vehicle 10,10*v*. For example, a platform of the vehicle 10,10*v* may be manufactured by combining a front module, a center module and a rear module. The front module constitutes a front part of the platform, the center module constitutes a center part of the platform, and the rear module constitutes a rear part of the platform. The number of the modules constituting the platform is not limited to three but may be equal to or less than two, or equal to or greater than four. In addition to or instead of the component of the platform, any parts of the vehicle 10,10*v* different from the platform may be modularized. Various modules may include an arbitrary exterior component such as a bumper or a grill, or an arbitrary interior component such as a seat or a console. Not only the vehicle 10,10*v* but also any types of moving object may be manufactured by combining a plurality of modules. Such a module may be manufactured by joining a plurality of components by welding or using a fixture, for example, or may be manufactured by forming at least part of the module integrally as a single component by casting. A process of forming at least part of a module as a single component is also called Giga-casting or Mega-casting. Giga-casting can form each part conventionally formed by joining multiple parts in a moving object as a single component. The front module, the center module, or the rear module described above may be manufactured using Giga-casting, for example.

D-19. Alternative Embodiment 19

A configuration for realizing running of the vehicle 10,10*v* by unmanned driving is also called a "Remote Control auto Driving system". Conveying a vehicle using Remote Control Auto Driving system is also called "self-running conveyance". Producing the vehicle 10,10*v* using self-running conveyance is also called "self-running production". In self-running production, for example, at least part of the conveyance of the vehicle 10,10*v* is realized by self-running conveyance in a factory where the vehicle 10, 10*v* is manufactured.

The present disclosure is not limited to the embodiments described above, but can be realized in various configurations without departing from the spirit thereof. For example, the technical features of the embodiments corresponding to the technical features in each of the aspects stated in the Summary of the Invention section may be replaced or combined as appropriate to solve some or all of the problems described above or to achieve some or all of the effects described above. Further, if the technical feature is not described as essential in this specification, the technical feature may be deleted as appropriate.

What is claimed is:

1. A remote control device that performs remote control of operation of a plurality of moving objects capable of moving by unmanned driving, wherein a plurality of production steps are performed on the plurality of moving objects in a production process in a factory, the plurality of moving objects include a front moving object and a rear moving object that runs behind the front moving object, and each of the plurality of moving objects is a vehicle, and the remote control device comprises:

a communication device;

a processor programmed to:

acquire, for at least one of the front moving object and the rear moving object, production step information via the communication device, which is information regarding one production step that is being performed on the moving object;

set a target distance between the front moving object and the rear moving object according to the production step information;

based on the production step information, set the target distance to be longer than a standard distance if inter-moving-object work is to be performed on at least one of the front moving object and the rear moving object, and reset the target distance after the inter-moving-object work is completed;

generate a first control signal, which is at least one of a front first control signal as a control signal to define the operation of the front moving object and a rear first control signal as a control signal to define the operation of the rear moving object so as to set an actual distance between the front moving object and the rear moving object to the target distance;

transmit the first control signal to at least one of the front moving object and the rear moving object, as the moving object subjected to control of the operation so that the actual distance matches the target distance; and perform, when the target distance is longer than the actual distance, at least one of:

(i) generating the rear first control signal to cause the rear moving object to perform at least one of a deceleration process to decrease acceleration in a forward direction and a backing process to move backward in an opposite direction of the forward direction; and (ii) generating the front first control signal to cause the front moving object to perform an acceleration process to increase acceleration in a forward direction.

2. The remote control device according to claim 1, wherein the production step information includes inter-moving-object work information, which indicates whether or not the inter-moving-object work, in which workers enter a region between the front moving object and the rear moving object to work, is performed.

3. The remote control device according to claim 1, wherein the production process has a movement process in which the moving object moves between a first work site where the one production step is performed and a second work site where a next production step, which is performed after the one production step, is performed, the processor is further configured to:

determine whether or not the one production step has been completed, and when it is determined that the one production step in which the inter-moving-object work is performed has been completed, the processor is programmed to:

set the target distance to the standard distance, which is a distance between the front moving object and the rear moving object and is shorter than the target distance when the inter-moving-object work is performed, generate a second control signal, which is at least one of a front second control signal as the control signal to define the operation of the front moving object and a rear second control signal as the control signal to define the operation of the rear moving object so as to set the actual distance to the standard distance as the target distance in the movement process, and transmit the second control signal to the moving object subjected to control of the operation.

4. The remote control device according to claim 1, wherein the production process has a movement process in which the moving object moves between a first work site where the one production step is performed and a second work site where a next production step, which is performed after the one production step, is performed, the processor is programmed to acquire next production step information, which is information regarding the next production step, the processor is programmed to determine whether or not the one production step has been completed, and when it is determined that the one production step has been completed, the processor is programmed to set the target distance to a next target distance, which is a distance between the front moving object and the rear moving object according to the next production step information, the processor is programmed to generate a third control signal, which is at least one of a front third control signal to define the operation of the front moving object and a rear third control signal to define the operation of the rear moving object so as to set the actual distance to the next target distance as the target distance in the movement process, and the processor is programmed to transmit the third control signal to the moving object subjected to control of the operation.

5. The remote control device according to claim 3, wherein the inter-moving-object work is an assembly work to assemble a communicable device capable of communication with the remote control device to the moving object, and the processor is programmed to determine that the one production step in which the inter-moving-object work is performed has been completed when the remote control device is capable of communication with the communicable device, and determines that the one production step in which the inter-moving-object work is performed has not been completed when the remote control device is incapable of communication with the communicable device.

6. A control system that controls operation of a plurality of moving objects capable of moving by unmanned driving, wherein a plurality of production steps are performed on a plurality of the moving objects in a production process in a factory, and each of the plurality of moving objects is a vehicle, and the control system comprises:

a communication device;

the plurality of moving objects including a front moving object and a rear moving object that runs behind the front moving object;

a processor programmed to:

acquire, for at least one of the front moving object and the rear moving object, production step information via the communication device, which is information regarding one production step that is being performed on the moving object;

set a target distance between the front moving object and the rear moving object according to the production step information;

based on the production step information, set the target distance to be longer than a standard distance if inter-moving-object work is to be performed on at least one of the front moving object and the rear moving object, and reset the target distance after the inter-moving-object work is completed;

generate a first control signal, which is at least one of a front first control signal as a control signal to define the operation of the front moving object and a rear first control signal as a control signal to define the operation of the rear moving object so as to set an actual distance between the front moving object and the rear moving object to the target distance;

a vehicle processor that controls the operation of at least one of the front moving object and the rear moving object using the first control signal so that the actual distance matches the target distance, wherein when the target distance is longer than the actual distance, the processor is programmed to perform at least one of:

(i) generating the rear first control signal to cause the rear moving object to perform at least one of a deceleration process to decrease acceleration in a forward direction and a backing process to move backward in an opposite direction of the forward direction; and (ii) generating the front first control signal to cause the front moving object to perform an acceleration process to increase acceleration in a forward direction.

7. The control system according to claim 6, wherein the production step information includes inter-moving-object work information, which indicates whether or not the inter-moving-object work, in which workers enter a region between the front moving object and the rear moving object to work, is performed.

8. The control system according to claim 6, wherein the production process has a movement process in which the moving object moves between a first work site where the one production step is performed and a second work site where a next production step, which is performed after the one production step, is performed, the processor is programmed to determine whether or not the one production step has been completed, and when it is determined that the one production step in which the inter-moving-object work is performed has been completed, the processor sets the target distance to the standard distance, which is a distance between the front moving object and the rear moving object and is shorter than the target distance when the inter-moving-object work is performed, the processor generates a second control signal, which is at least one of a front second control signal as the control signal to define the operation of the front moving object and a rear second control signal as the control signal to define the operation of the rear moving object so as to set the actual distance to the standard distance as the target distance in the movement process, and the vehicle processor controls the operation of the moving object using the second control signal without using the first control signal in the movement process.

9. The control system according to claim 6, wherein the production process has a movement process in which the moving object moves between a first work site where the one production step is performed and a second work site where a next production step, which is performed after the one production step, is performed, the processor is programmed to further acquire next production step information, which is information regarding the next production step, the processor is programmed to determine whether or not the one production step has been completed, and when it is determined that the one production step has been completed, the processor is programmed to set the target distance to a next target distance, which is a distance between the front moving object and the rear moving object according to the next production step information, the processor is programmed to generate a third control signal, which is at least one of a front third control signal to define the operation of the front moving object and a rear third control signal to define the operation of the rear moving object so as to set the actual distance to the next target distance as the target distance in the movement process, and the vehicle processor controls the operation of the moving object using the third control signal without using the first control signal in the movement process.

10. The control system according to claim 8, wherein the inter-moving-object work is an assembly work to assemble a communicable device capable of communication with outside of the moving object to the moving object, and the processor is programmed to determine that the one production step in which the inter-moving-object work is performed has been completed when the communicable device is capable of communication with the outside of the moving object, and determines that the one production step in which the inter-moving-object work is performed has not been completed when the communicable device is incapable of communication with the outside of the moving object.

11. A moving object configured as a vehicle capable of moving by unmanned driving in a factory where a plurality of production steps are performed in a production process for producing the moving object, wherein the moving object comprises a moving object control device that controls operation of the moving object, and the moving object control device comprises:

a communication device;

a processor programmed to:

acquire production step information via the communication device, which is information regarding one production step that is being performed on at least one of the moving object and another moving object, which is another one of the moving object that moves at least one of ahead and behind of the moving object;

set a target distance between the moving object and the another moving object according to the production step information;

based on the production step information, set the target distance to be longer than a standard distance if inter-moving-object work is to be performed on at least one of the moving object and the another moving object, and reset the target distance after the inter-moving-object work is completed;

generate a first control signal as a control signal to define the operation of the moving object so as to set an actual distance between the moving object and the another moving object to the target distance; and a vehicle processor that controls the operation of the moving object using the first control signal so that the actual distance matches the target distance, wherein when the target distance is longer than the actual distance and the moving object is moving behind the another moving object, the processor generates the first control signal to cause the moving object to perform at least one of a deceleration process to decrease acceleration in a forward direction and a backing process to move backward in an opposite direction of the forward direction.

12. The moving object according to claim 11, wherein the production step information includes inter-moving-object work information, which indicates whether or not the inter-moving-object work, in which workers enter a region between the moving object and the another moving object to work, is performed.

13. The moving object according to claim 11, wherein when the target distance is longer than the actual distance and the moving object is moving ahead of the another moving object, the processor generates the first control signal to cause the moving object to perform an acceleration process to increase acceleration in a forward direction.

14. The moving object according to claim 11, wherein the production process has a movement process in which the moving object moves between a first work site where the one production step is performed and a second work site where a next production step, which is performed after the one production step, is performed, the processor is programmed to determine whether or not the one production step has been completed, and when it is determined that the one production step in which the inter-moving-object work is performed has been completed, the processor sets the target distance to the standard distance, which is a distance between the moving object and the another moving object and is shorter than the target distance when the inter-moving-object work is performed, the processor generates a second control signal as the control signal to define the operation of the moving object so as to set the actual distance to the standard distance as the target distance in the movement process, and the vehicle processor controls the operation of the moving object using the second control signal without using the first control signal in the movement process.

15. The moving object according to claim 11, wherein the production process has a movement process in which the moving object moves between a first work site where the one production step is performed and a second work site where a next production step, which is performed after the one production step, is performed, the processor is programmed to acquire next production step information, which is information regarding the next production step, the processor is programmed to determine whether or not the one production step has been completed, and when it is determined that the one production step has been completed, the processor is programmed to set the target distance to a next target distance, which is a distance between the moving object and the another moving object according to the next production step information, the processor is programmed to generate a third control signal to define the operation of the moving object so as to set the actual distance to the next target distance as the target distance in the movement process, and the vehicle processor controls the operation of the moving object using the third control signal without using the first control signal in the movement process.

* * * * *